US012490991B2

(12) United States Patent
Goldenberg et al.

(10) Patent No.: US 12,490,991 B2
(45) Date of Patent: Dec. 9, 2025

(54) SYSTEMS AND METHODS FOR HEMOCLIP DEPLOYMENT

(71) Applicant: CEDARS-SINAI MEDICAL CENTER, Los Angeles, CA (US)

(72) Inventors: David Goldenberg, Los Angeles, CA (US); Andy Schieber, Tustin, CA (US); Marcus Souza, Costa Mesa, CA (US); Andrew DiGiore, New York, NY (US); Ryan Evans, San Francisco, CA (US)

(73) Assignee: Cedars-Sinai Medical Center, Los Angeles, CA (US)

( * ) Notice: Subject to any disclaimer, the term of this patent is extended or adjusted under 35 U.S.C. 154(b) by 405 days.

(21) Appl. No.: 17/922,710

(22) PCT Filed: May 6, 2021

(86) PCT No.: PCT/US2021/031185
§ 371 (c)(1),
(2) Date: Nov. 1, 2022

(87) PCT Pub. No.: WO2021/226400
PCT Pub. Date: Nov. 11, 2021

(65) Prior Publication Data
US 2023/0172616 A1      Jun. 8, 2023

Related U.S. Application Data

(60) Provisional application No. 63/037,897, filed on Jun. 11, 2020, provisional application No. 63/022,292, filed on May 8, 2020.

(51) Int. Cl.
*A61B 17/128* (2006.01)
*A61B 17/00* (2006.01)
(Continued)

(52) U.S. Cl.
CPC .......... *A61B 17/1285* (2013.01); *A61B 90/03* (2016.02); *A61B 2017/00292* (2013.01);
(Continued)

(58) Field of Classification Search
CPC ................ A61B 17/1285; A61B 90/03; A61B 2090/034; A61B 2017/00292;
(Continued)

(56) References Cited

U.S. PATENT DOCUMENTS 1,025,362 A    5/1912   Beuoy
2,622,300 A    12/1952  Katy
(Continued)

FOREIGN PATENT DOCUMENTS

CN    104173090 A    12/2014
EP    4146092 A1     3/2023
(Continued)

OTHER PUBLICATIONS

EP Search Report for EP 19881966.6 dated Jul. 19, 2022, 25 pages.
(Continued)

*Primary Examiner* — Mohamed G Gabr
*Assistant Examiner* — Khoa Tan Le
(74) *Attorney, Agent, or Firm* — Nixon Peabody LLP

(57) ABSTRACT

Disclosed are systems and methods for safely and effectively deploying a hemoclip onto a patient's desired target using a hemoclip system. For instance, disclosed is an catheter that includes a lumen for a hemoclip to pass through. Additionally, disclosed are hemoclips that are configured to be in a compressed position until the hemoclip is deployed out of a catheter where it opens. Then, the hemoclip may be clipped onto the target to encapsulate the desired target within the patient. Once the hemoclip is clamped onto the target, the
(Continued)

catheter can move onto the next target for successive deployment and utilization of the hemoclips without manual reload.

18 Claims, 31 Drawing Sheets

(51) Int. Cl.
 *A61B 17/12* (2006.01)
 *A61B 90/00* (2016.01)
(52) U.S. Cl.
 CPC ............... *A61B 2017/00367* (2013.01); *A61B 2017/00477* (2013.01); *A61B 2017/12004* (2013.01); *A61B 2090/034* (2016.02)
(58) Field of Classification Search
 CPC ........... A61B 2017/00367; A61B 2017/00477; A61B 2017/12004
 See application file for complete search history.

(56) References Cited

U.S. PATENT DOCUMENTS

| | | | |
|---|---|---|---|
| 2,667,678 | A | 2/1954 | Hargrave |
| 3,779,108 | A | 12/1973 | Reiter |
| 3,854,482 | A | 12/1974 | Laugherty |
| 3,958,576 | A | 5/1976 | Kamiya |
| 4,360,023 | A | 11/1982 | Sugita |
| 4,390,019 | A | 6/1983 | LeVeen |
| 4,556,060 | A | 12/1985 | Perlin |
| 4,612,932 | A | 9/1986 | Caspar |
| 4,637,395 | A | 1/1987 | Caspar |
| 4,791,707 | A | 12/1988 | Tucker |
| 4,815,466 | A | 3/1989 | Perlin |
| 4,902,078 | A | 2/1990 | Judd |
| 4,919,152 | A | 4/1990 | Ger |
| 4,932,955 | A | 6/1990 | Merz |
| 5,022,126 | A | 6/1991 | Davis |
| 5,159,730 | A | 11/1992 | Radvin |
| 5,640,742 | A | 6/1997 | White et al. |
| 5,725,542 | A | 3/1998 | Yoon |
| 5,862,815 | A | 1/1999 | Murphy et al. |
| 5,983,459 | A | 11/1999 | Goldenberg |
| 6,179,850 | B1 | 1/2001 | Goradia |
| 6,468,285 | B1 | 10/2002 | Hsu |
| 7,766,313 | B2 | 8/2010 | Panosian |
| 9,532,786 | B2 | 1/2017 | Guzman Sanchez |
| 9,795,390 | B2 | 10/2017 | Jin et al. |
| 9,861,365 | B2 | 1/2018 | Zieris |
| 10,039,565 | B2 | 8/2018 | Vezzu |
| 10,105,141 | B2 | 10/2018 | Harris |
| 10,537,327 | B2 | 1/2020 | Park |
| 10,610,234 | B2 | 4/2020 | Xu |
| 10,631,868 | B2 | 4/2020 | Ad |
| 10,639,044 | B2 | 5/2020 | Prior |
| 10,952,742 | B2 | 3/2021 | Lehtinen |
| 11,648,014 | B2 | 5/2023 | Foshee |
| 11,660,097 | B2 | 5/2023 | Roundy |
| 11,748,581 | B2 | 9/2023 | Harris |
| 11,911,042 | B2 | 2/2024 | Winkler |
| 2002/0115964 | A1 | 8/2002 | Boudreau |
| 2005/0107809 | A1 | 5/2005 | Litscher et al. |
| 2005/0119677 | A1 | 6/2005 | Shipp |
| 2005/0216036 | A1 | 9/2005 | Nakao |
| 2005/0245862 | A1* | 11/2005 | Seward .............. A61M 25/0133 604/95.04 |
| 2006/0100646 | A1 | 5/2006 | Hart |
| 2006/0224170 | A1 | 10/2006 | Duff |
| 2007/0265640 | A1 | 11/2007 | Kortenbach |
| 2008/0024317 | A1 | 1/2008 | Chen et al. |
| 2008/0039879 | A1 | 2/2008 | Chin |
| 2008/0097398 | A1* | 4/2008 | Mitelberg ......... A61M 25/0043 604/525 |
| 2008/0243178 | A1 | 10/2008 | Oren |
| 2011/0190791 | A1* | 8/2011 | Jacobs ............... A61B 17/1285 606/139 |
| 2012/0179171 | A1 | 7/2012 | Cohen et al. |
| 2014/0114332 | A1 | 4/2014 | Lutze |
| 2014/0249551 | A1 | 9/2014 | Adams et al. |
| 2015/0088173 | A1 | 3/2015 | Guzman Sanchez |
| 2015/0112367 | A1 | 4/2015 | Damarati |
| 2015/0272588 | A1 | 10/2015 | Khan |
| 2016/0000433 | A1 | 1/2016 | Raybin et al. |
| 2018/0132855 | A1 | 5/2018 | Xu |
| 2018/0344323 | A1 | 12/2018 | Shi |
| 2019/0133598 | A1* | 5/2019 | Uesaka .............. A61B 17/1227 |
| 2020/0113573 | A1* | 4/2020 | Shi .................... A61B 17/1285 |
| 2020/0146685 | A1 | 5/2020 | Jin et al. |
| 2021/0378675 | A1 | 12/2021 | Goldenberg |
| 2023/0172616 | A1 | 6/2023 | Goldenberg |

FOREIGN PATENT DOCUMENTS

| | | | | |
|---|---|---|---|---|
| KR | 101826446 | B1 | 2/2018 | |
| WO | WO-2018228020 | A1 * | 12/2018 | ............ A61B 17/08 |
| WO | 2020096981 | A1 | 5/2020 | |
| WO | 2021226400 | A1 | 11/2021 | |

OTHER PUBLICATIONS

PCT Search Report and Written Opinion for PCT/US2021/031185 dated Oct. 7, 2021, 11 pages.
ISR/WO for PCT/US2019/059702 dated Jan. 21, 2020, 8 pages.
European Search Report dated May 2, 2024 for EP 4146092, 16 pages.

* cited by examiner

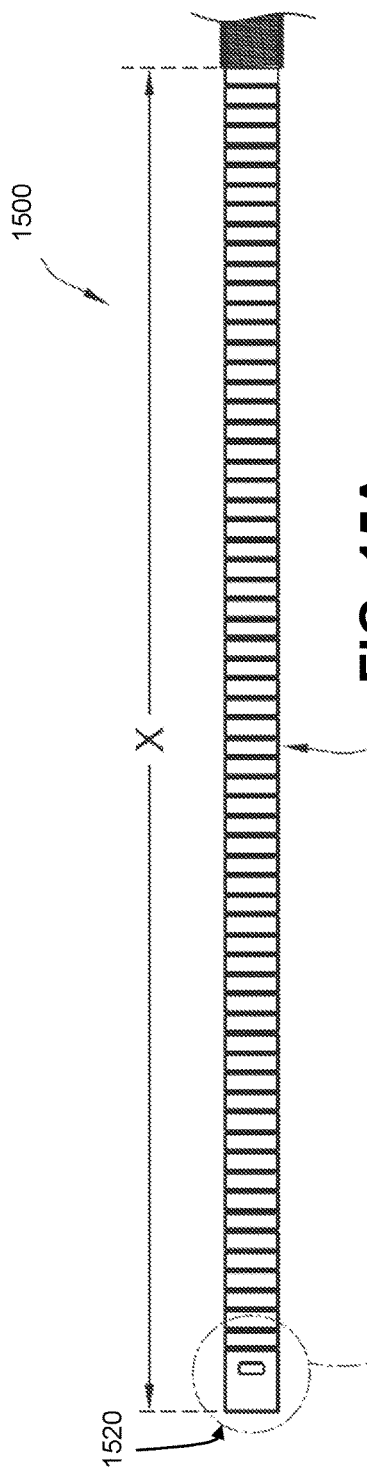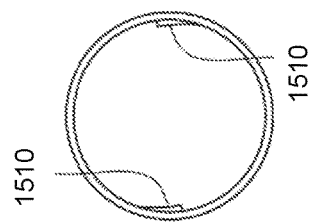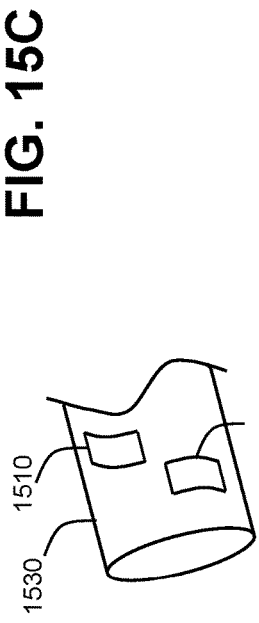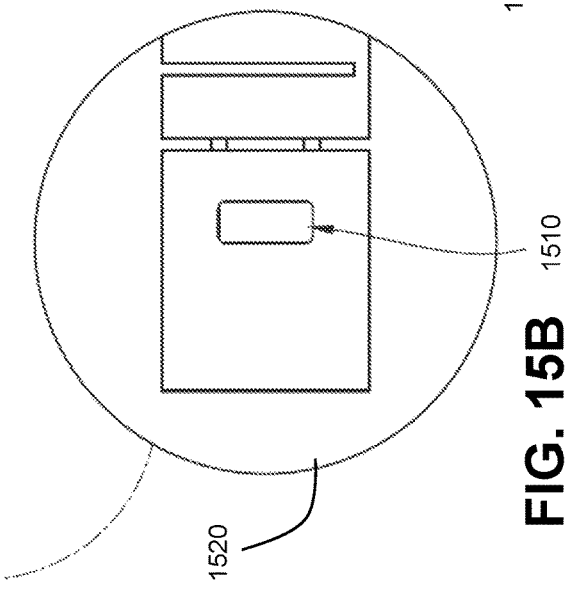

SYSTEMS AND METHODS FOR HEMOCLIP DEPLOYMENT

CROSS-REFERENCE TO RELATED APPLICATIONS

This application is a national phase of International Application No. PCT/US2021/031185, filed May 6, 2021, which designated the U.S. and that International Application was published under PCT Article 21(2) in English. This application claims priority to U.S. Provisional Application No. 63/022,292 filed May 8, 2020 titled "SYSTEMS AND METHODS FOR HEMOCLIP DEPLOYMENT," and U.S. Provisional Application No. 63/037,897 filed Jun. 11, 2020 titled "SYSTEMS AND METHODS FOR HEMOCLIP DEPLOYMENT," the contents of which are incorporated herein by reference in its entirety.

FIELD OF THE DISCLOSURE

The present disclosure relates to systems and methods for deploying hemoclips.

BACKGROUND OF THE DISCLOSURE

The following description includes information that may be useful in understanding the present disclosure, it is not an admission that any of the information provided herein is prior art or relevant to the present disclosure, or that any publication specifically or implicitly referenced is prior art.

Endoscopic procedures are commonly performed to diagnose and treat gastrointestinal pathology occurring in the lumen of the GI tract. For instance, an endoscope is placed at a targeted location within the patient's body in order to facilitate access to the body ducts and lumens. Since the endoscope itself often cannot conduct a therapeutic procedure, the endoscope is equipped with a catheter, a lumen, and/or an internal channel so that various medical devices can be fitted through the endoscope to the treatment site within the patient's body.

An example of such medical devices is an endoscopic hemoclip device. The endoscopic hemoclips are primary means of permanent tissue approximation in the lumens of the gastrointestinal tract with a wide range of clinical applications. While initially developed to control intraluminal gastrointestinal bleeding during endoscopy, it has been further expanded for a variety of other clinical applications, including, but not limited to closing perforations, securing stents, controlling enteral feeding tubes position, marking lesions for x-ray imaging, and the like.

SUMMARY OF THE DISCLOSURE

Hemoclips are deployed from the endoscope and are used to stop internal bleeding by clamping together the edges of a wound. For instance, an endoscopic hemoclip device including clips attached to its distal end may be inserted through the endoscope's lumen, wherein a clip can be deployed at the treatment site to be clamped over the wound and detach from the device. Currently, hemoclips are metallic clips attached to a wire that runs through a plastic sheath. They are disposable device that fires a single clip at a time and each clip can cost several hundred dollars. Further, each hemoclip must be loaded individually through a cumbersome and expensive process.

In order to address the issue of re-loading hemoclips one by one, some approaches stack multiple hemoclips, which may be deployed successively. An example device for deploying multiple hemoclips is shown by Jin et al in US Patent Application US 2020/0146685. Therein, a set of tissue clips are positioned within an outer tube. Each tissue clip includes a clip piece and a clip base attached to the clip piece. Further, a control wire with a proximal release member is used to move the clips in the outer tube towards an opening for deployment.

However, the inventors herein have identified disadvantages with the above-mentioned system. For example, the tissue clip is only capable of linear movement to the opening, and has no provision for rotational movement or further linear adjustment. As such, an operator is unable to make positional adjustment of the tissue clip. For example, once the tissue clip is pushed towards the opening, Jin's device does not provide any further adjustment (linear or rotational) to the position of the tissue clip. Thus, with Jin's device, the operator has to adjust the entire outer tube to reach a desired position, and such adjustments take a long time, for example, due to the length of the outer tube. As a result, an overall duration of the procedure is prolonged leading to poor patient outcomes.

Further, in order to release the tissue clip after closing, the control wire after being pulled out of engagement from the tissue clip must be used to push the tissue clip out of the outer tube. This may lead to inefficient and/or incomplete release as the control wire may re-engage and/or not have sufficient force to push the tissue clip out of the outer tube. Further, the operator may not be able to determine when the tissue clip is completely released.

Furthermore, after grabbing a target tissue, the tissue clip is then drawn back so that the two clip piece bodies are closed to clamp a target site to be hemostatic. The retraction of the tissue clip may cause the target tissue to be pulled excessively resulting in unwanted tissue damage.

The inventors have identified the above-mentioned disadvantages and provide systems and methods for at least partially addressing some the issues discussed above. In one example, a closing ring for a hemoclip comprises: a body comprising at least one catheter interface and at least one jaw locking interface; wherein the at least one catheter interface is configured to engage with a catheter, the catheter housing the closing ring; and wherein the at least one jaw locking interface is configured to engage with at least one jaw of two or more jaws of the hemoclip. In this way, by utilizing a closing ring that releasably interfaces with a catheter, positioning of the hemoclip with respect to the target is significantly improved.

As a non-limiting example, during deployment, a hemoclip (alternatively referred to herein as an endoclip) may be advanced to a distal opening of a catheter by using an actuation wire, and with a simple rotation of the catheter via a handle (e.g., using a thumbwheel), the closing ring of the hemoclip may interface and engage with the catheter. Once engaged, the catheter along with the closing ring may be rotated, as well as advanced or retracted, in any order, to position the hemoclip with respect to tissue. For instance, in order to close the jaws of the hemoclip while maintaining a position of the hemoclip jaws with respect to the target tissue, the catheter and the closing ring may be advanced over the hemoclip. Further, the hemoclip may be locked to close the target tissue by disengaging the closing ring from the catheter and engaging a jaw locking interface of the closing ring with corresponding locking tabs on the jaws. In this way, by utilizing a closing ring that can releasably engage with the catheter, an operator may deploy the hemoclip at the target site more quickly and efficiently, and with reduced tissue damage. Further, when engaged with the catheter, the closing ring may allow the hemoclip to be rotated to a desired position, thereby enabling proper positioning of the hemoclip prior to deployment.

Furthermore, in order release the hemoclip, the actuation wire may be released via a trigger of the handle and/or rotation of the catheter. In this way, the hemoclip is released from the catheter with improved efficiency. Further still, the catheter may house one or more hemoclips that may be deployed successively. For example, after deploying one hemoclip, the actutation wire may engage with the next hemoclip for deployment. Thus, the combination of the hemoclip and the catheter allows an operator to deploy multiple hemoclips successively with improved efficiency.

Further, the catheter is configured such that the catheter has a large rotational range including small angular displacement (e.g., to move a tab of the catheter out of an interface window on the hemoclip) and varying degrees of rotation (e.g., to rotate an engaged hemoclip for positioning). As a result, an operator is able to maneuver the hemoclip and/or the catheter with improved ease and efficiency to adjust positioning of the hemoclip and deploy multiple hemoclips. In this way, the systems and methods described herein provide significant improvement in hemostatic devices over previous approaches by improving positioning, improving efficiency of deployment of multiple hemoclips and maintaining tissue integrity. Thus, the implementation of the presently disclosed devices and methods will result in better clinical results, more cost effective hemoclip deployments, and efficient patient care.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings, which are incorporated in and constitute a part of this specification, exemplify the embodiments of the present disclosure and the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

FIG. 15A illustrates a side view of an example of a catheter or tunnel for an endoscope with one or more embodiments of the present disclosure;

FIG. 15B illustrates an enlarged view of a distal portion of the catheter of FIG. 15A;

FIG. 15C illustrates a top view of the catheter of FIG. 15A;

FIG. 15D illustrates offset positions of retention tabs of the catheter of FIG. 15A;

Figures 1A, 1B:
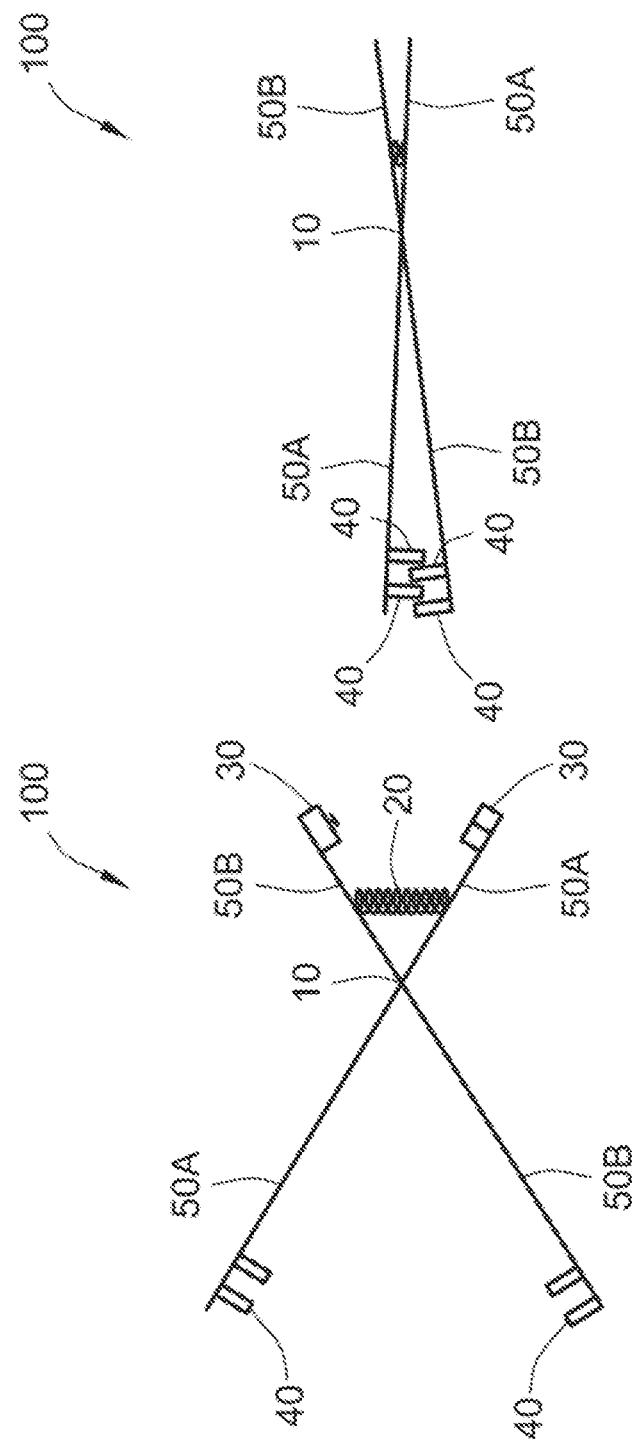
FIG. 1A illustrates an example of an endoscopic hemoclip that is deployed and in an open position in accordance with the principles of the present disclosure.
FIG. 1B illustrates an example of an endoscopic hemoclip that is not deployed and in a closed position in accordance with the principles of the present disclosure.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION OF THE PRESENT DISCLOSURE

Unless defined otherwise, technical and scientific terms used herein have the same meaning as commonly understood by one of ordinary skill in the art to which this disclosure belongs. Szycher's Dictionary of Medical Devices CRC Press, 1995, may provide useful guidance to many of the terms and phrases used herein. One skilled in the art will recognize many methods and materials similar or equivalent to those described herein, which could be used in the practice of the present disclosure. Indeed, the present disclosure is in no way limited to the methods and materials specifically described.

In some embodiments, properties such as dimensions, shapes, relative positions, and so forth, used to describe and claim certain embodiments of the disclosure are to be understood as being modified by the term "about."

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

As used herein, the term "endoscope" refers to a slender tubular instrument that is inserted into a body cavity or body part for the purpose of visual examination, diagnosis or surgical treatment. This term encompasses, but is not limited to upper endoscopes, adult colonoscopes, pediatric colonoscopes, gastroscopes, enteroscopes, laparoscope, arthroscope, and rectoscope.

As used herein, the term "operator" refers to a person operating an endoscope and performing tissue approximation using one or more hemoclips. This term includes, but not limited to clinician, a physician, a surgeon, and an assistant to a surgeon.

As used herein, the term "subject" or "patient" refers to a human or non-human animal (e.g., mouse, rat, rabbit, dog, cat, cattle, swine, sheep, horse, or primate).

As used herein, catheters described in the present disclosure may include or house one or more hemoclips.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Overview

Disclosed are systems and methods for safely and effectively deploying a hemoclip onto a target site within a patient using an endoscopic system. For instance, disclosed is an endoscope that includes a lumen for hemoclips to be stored and pass through before they are deployed. The endoscope may include a proximal end connected to a handle, and a distal end that is configured to enter the patient's body. The disclosed configuration of the endoscope for deploying hemoclips, results in an effective and efficient deployment of multiple hemoclips in succession within the patient's body.

Various embodiments are provided for a hemoclip system comprising a closing ring that interfaces and engages with a catheter. In one example, the catheter may be an endoscope. In another example, the catheter may be introduced into a working channel of the endoscope. During deployment, the closing ring enables proper positioning of the hemoclip with respect to the target tissue and facilitates quick and efficient closing of jaws of the hemoclip, and further reduces tissue damage. In various embodiments, the hemoclip system enables improved clip placement via rotation and/or linear movement of a hemoclip to confidently secure tissue. In one non-limiting example, during deployment, the systems and methods describes herein enable a hemoclip to be closed, then opened, and then closed a second time to be deployed. This ability allows the operator to trial the position of a clip prior to deployment.

Further, the systems and methods described herein allow varying degrees of rotation via the handle, which is important for hemoclip positioning. Otherwise, the operator would have to rotate the device in the working channel which would be difficult or impossible due to friction. Further, the handle comprises one or more actuators to move the guidewire and/or the catheter housing the hemoclips to perform one or more of rotation, opening, and closing of the hemoclips which provides greater control to an operator.

Example 1: Hemoclip and Deploying Endoscope

Hemoclips

FIG. 1A illustrates an overview of an example of a hemoclip 100 that is deployed in an open position prior to clamping onto a desired target, such as, e.g., edges of a wound. The hemoclip 100 is configured in an X-shaped clip having a first jaw 50A and a second jaw 50B that are configured to be spread open in an open position as the hemoclip 100 is deployed from, e.g., an endoscope.

The first jaw 50A and the second jaw 50B are configured to intersect with one another as to form an X-shape with a pivot 10 in a center where the jaws intersect. The proximal portion of the jaws are configured to clamp onto a target site and a distal portion of the jaws are configured to snap shut and lock together to keep the proximal portion of the jaws claimed to the target sit. The pivot 10 may be any suitable pivot, including a joint with one axis of rotation, such as a simple bolt or other suitable methods.

In order to clamp down onto a target site, the hemoclip 100 includes a set of teeth 40 (or a claw) on each surface of first jaw 50A and the second jaw 50B on opposing sides from each other and facing each other inward. The set of teeth 40 are configured to lock onto a target with mechanical force, and the distal portion includes an adhesion or a clipping mechanism to keep the jaws locked shut.

The hemoclip 100 further includes a spring 20 located behind the pivot 10 towards the distal portion of the X-shaped clip which is configured to bias the jaws in an open position as the jaws are deployed out of the endoscope. This way, the jaws are automatically opened to encapsulate the target site as the X-shaped clip is being deployed prior to the jaws being closed onto the target.

In an alternative embodiment, instead of spring 20, the hemoclip 100 may include a piece of metal on its perimeter that would keep it closed at rest and a spring that forces the hemoclip 100 to open prior to deployment. The spring could be removed so that the jaws would close around the target site.

To clamp down onto the target site and keep the set of teeth 40 in a closed position as to hold onto the target, the first jaw 50A and the second jaw 50B each may include at least one securing latch 30 on opposing sides facing each other inward on the distal portion of the jaws. The at least one securing latch 30 may include various mechanical fasteners for clipping to pieces of metal together, for instance that lock when pressed together. For instance, the fastener may be a rod or screw on a distal portion of one of the jaws with angled portions that engage catches in a hole on a distal portion of the other jaw that faces the first jaw.

Alternatively, the at least one securing latches 30 may include any other mechanical means (e.g., a screw, locking mechanism, or others) or adhesive means (e.g., a biodegradable glue, a chemical adhesive, and the like) to close down onto each other. Once the securing latches 30 lock onto each other, it automatically closes both the distal and the proximal portions of the jaws so that the jaws can be closed onto the target site inside the patient while maintaining an X-shape.

Accordingly, as shown in, e.g., FIG. 1B, the hemoclip 100 remains in a compressed X-shape when it is not deployed from the endoscope because the sides of the tunnel confine it to the compressed shape. As shown, the set of teeth (or a staple) 40 may be configured to contain more than one tooth. Further, the spring 20 remains in a compressed position until it is deployed as shown in, e.g., FIG. 1A.

Endoscopes

Figure 2:
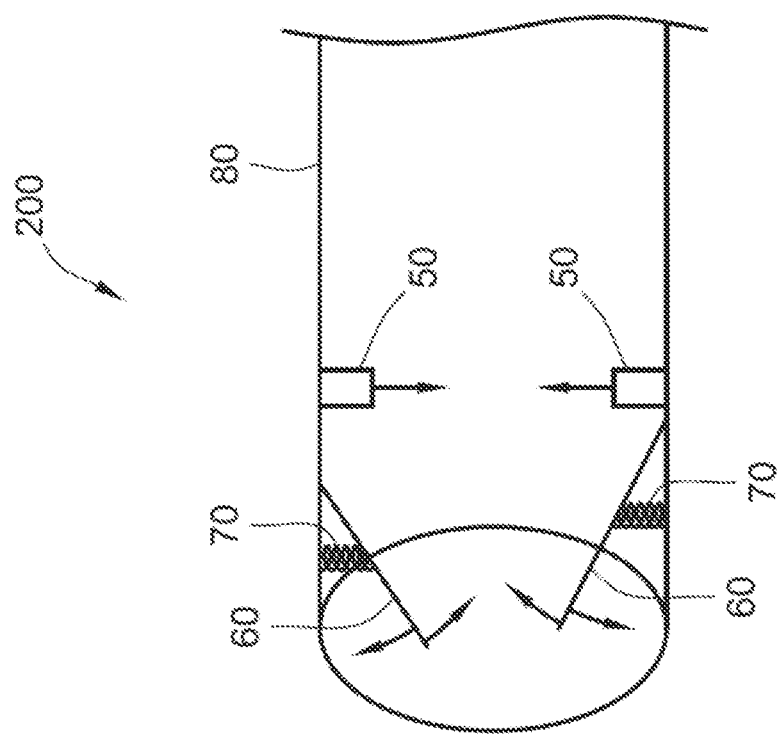
FIG. 2 illustrates an example of a distal end of a lumen of an endoscopic hemoclip device that is constructed in accordance with the principles of the present disclosure.

FIG. 2 illustrates an example of an endoscope 200 that is constructed in accordance with the principles of the present disclosure. The endoscope 200 includes a tunnel (or a lumen, channel, or catheter) 80 where the hemoclips 100 are stored, wherein the tunnel has a distal portion where a hemoclip 100 is deployed and a proximal portion connected to, e.g., a handle. The tunnel 80 may have a circular or rectangular, or other suitably shaped cross section and be sized to fit hemoclips. In some examples, the tunnel 80 may be a long plastic tube that will contain multiple staples in line front-to-back. In some examples, the tunnel 80 may be sized to fit hemoclips 100 so that they remain in a collapsed or compressed configuration when inside the tunnel 80.

The endoscope 200 may include a set of metal gates 60 towards the distal portion of the tunnel 80 containing a spring 70 underneath the set of metal gates 60 to push them together and create a one-way valve. The endoscope may also include at least one firing mechanism 50 on opposing sides of each other inside the tunnel 80 for compressing the distal portions of the jaws of the hemoclips 100 and locking the securing latches 30 together, and an opening 82 at the distal portion of the tunnel 80 where the hemoclip 100 is deployed out of the endoscope 200.

Alternatively, a plastic, a steel, or any other material may be used instead of metal in the set of metal gates 60. Further, the tunnel may include, e.g., a plastic, a metal, a steel, a biocompatible material, and the like.

Deployment of Hemoclips

Figure 3:
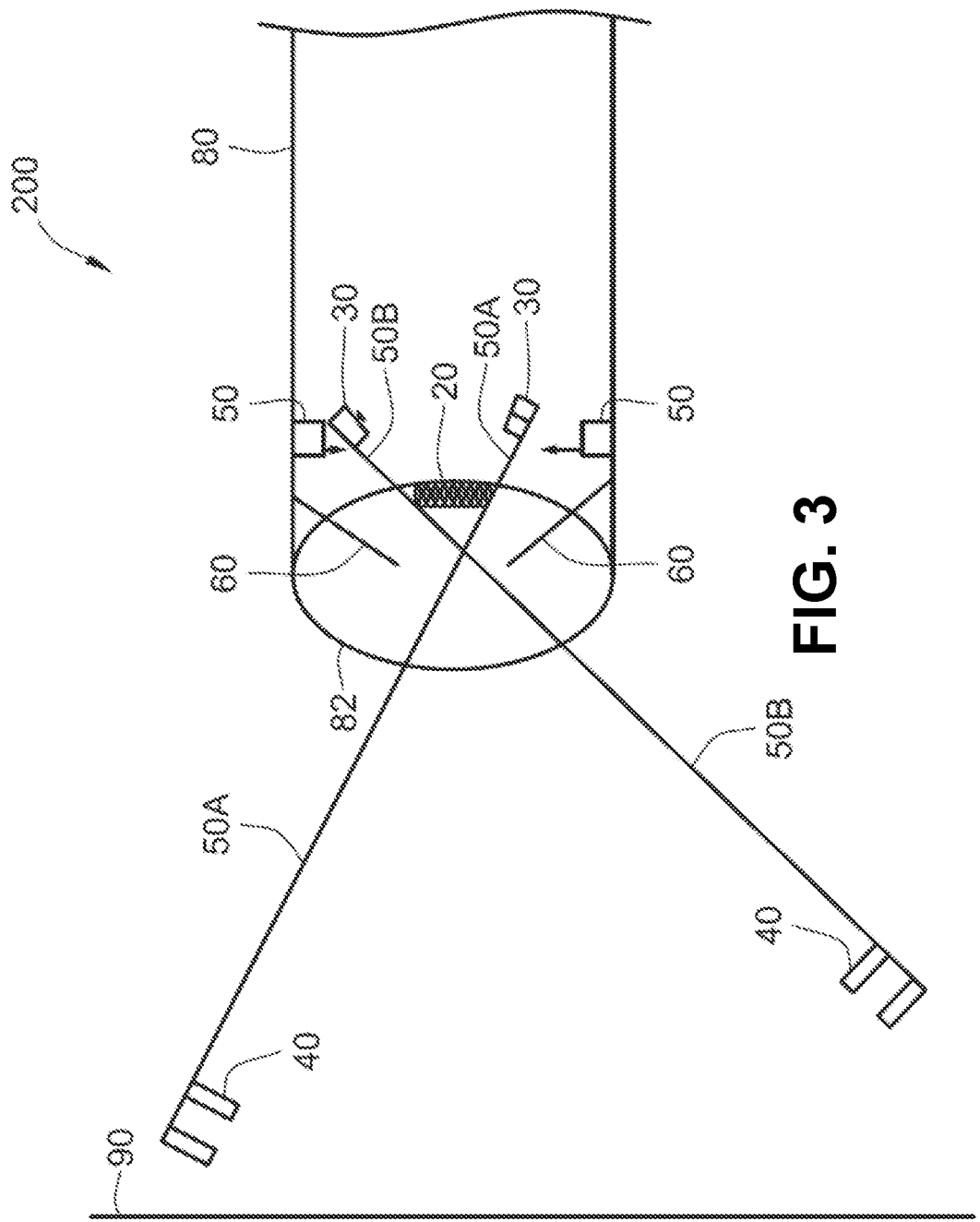
FIG. 3 illustrates an example of an endoscopic hemoclip being deployed through the distal end of the lumen of the endoscopic hemoclip device in accordance with one embodiment of the present disclosure.
Figure 4:
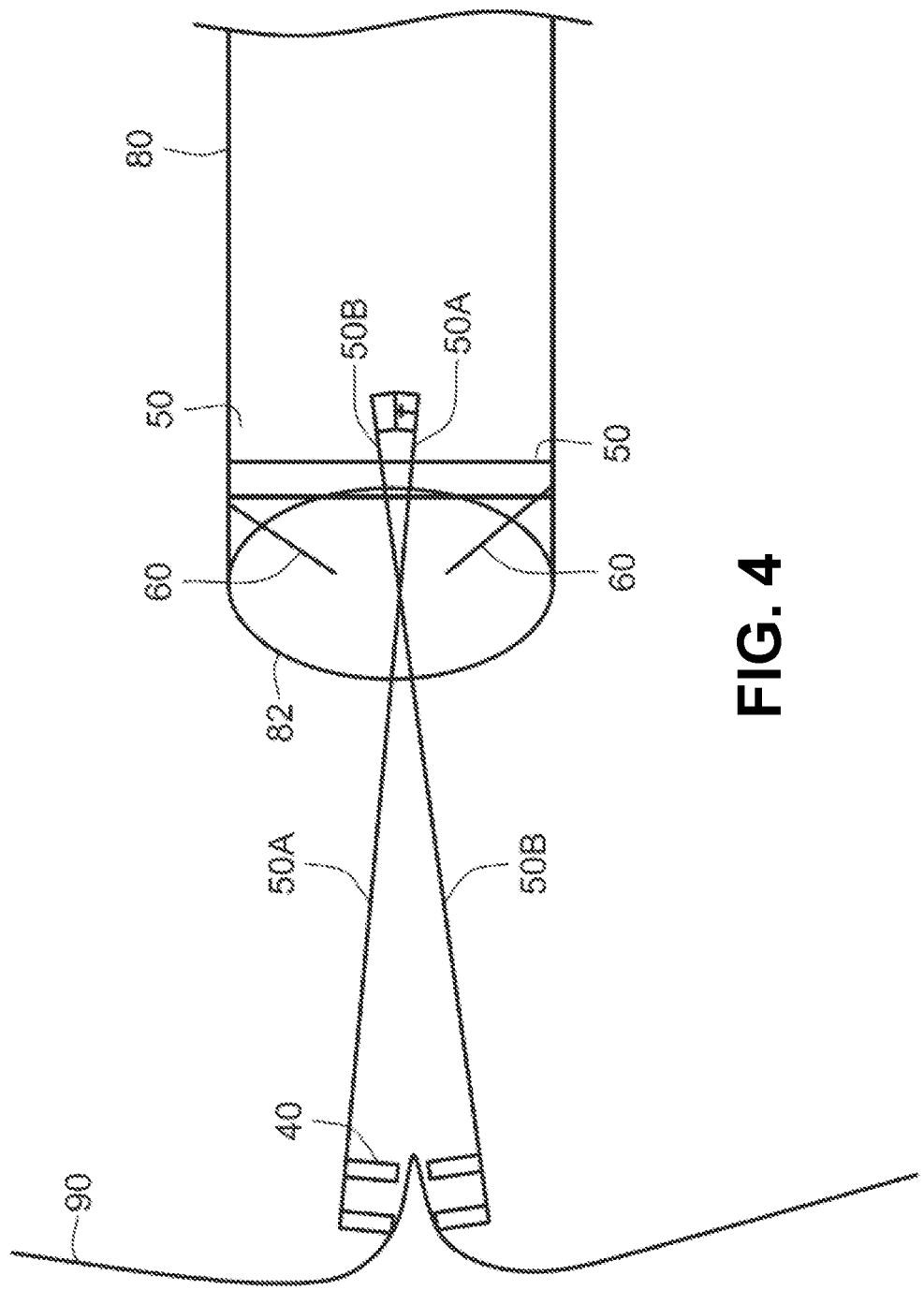
FIG. 4 illustrates an example of an endoscopic hemoclip clipping onto a patient's tissue and being deployed through the distal end of the lumen of the endoscopic hemoclip device in accordance with one embodiment of the present disclosure.
Figure 5:
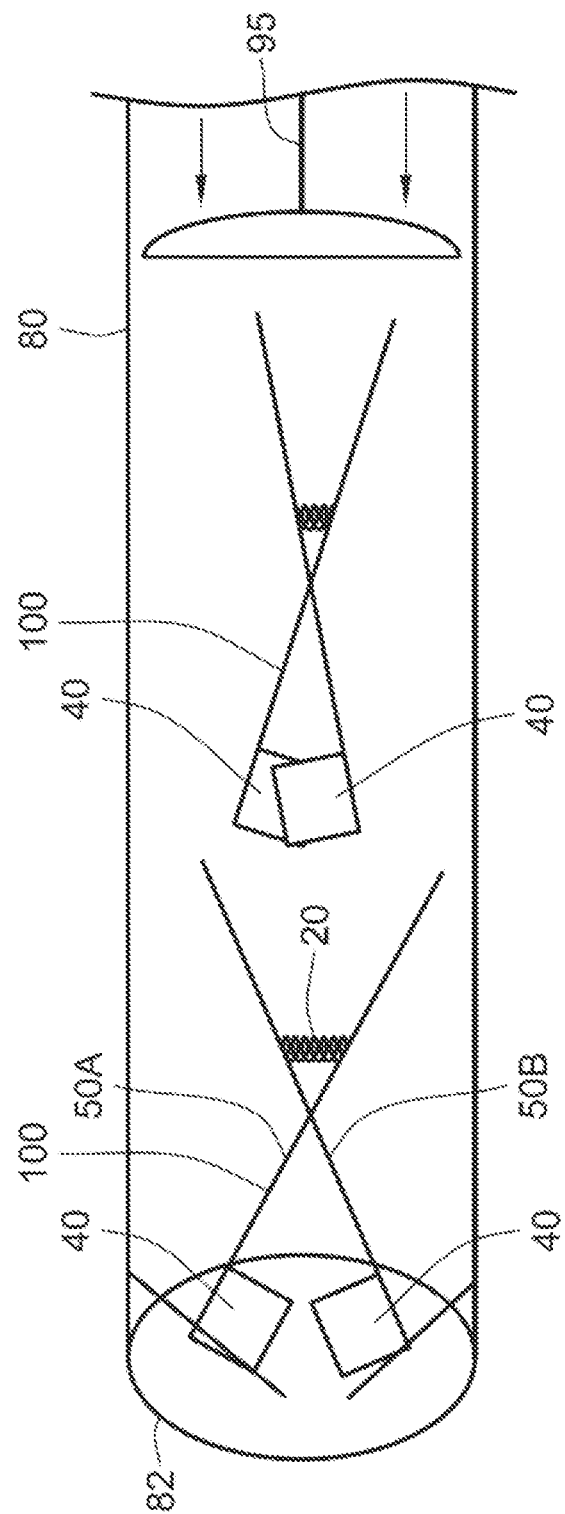
FIG. 5 illustrates an example of the endoscopic hemoclip device that is constructed in accordance with one embodiment of the present disclosure.

FIGS. 3-5 illustrate deployment of the hemoclips using the endoscopic hemoclip device. As illustrated, and referring to FIGS. 3-5 concurrently, a hemoclip 100 may be contained within an endoscope 200 and held in place by the set of gates 60. The set of gates 60 may be metal or other suitable materials and may be configured to open and close based on force (e.g., springs or other biasing mechanisms) such that it holds hemoclip 100 in place within the tunnel 80. The hemoclip 100, when not deployed, has a thinner profile due to the collapsibility provided by the pivot which allows it to fit through the set of gates 60. These gates function as a one-way valve to prevent clips from inadvertently falling backwards, as well as allow for stability needed for controlled application.

The hemoclip 100 may then be deployed by a pushing mechanism 95 (e.g., a plunger, bar, or other suitable device or mechanism) which would which would push the front half of one of the clips 100 out of the endoscope as shown in FIGS. 5 and 3. As the hemoclip 100 is pushed out of the tunnel 80, the set of metal gates are pushed open in a wider position and the spring 70 is compressed. After the hemoclip 100 is deployed, the spring 70 pushes the set of metal gates 80 back into its original position so that it can continue to hold additional hemoclips that are not yet deployed in place, thereby helping to facilitate storage and deployment of multiple hemoclips.

Once the front half of one of the hemoclips 100 is outside the gates 60, the spring mechanism 20 would push the jaws 40 open as they are no longer restrained by the tunnel 80. The clip 100 would still be held in position by the gates 60 because the proximal half of the clip 100 would be retained by the one-way valve gates 60 as shown in FIG. 3.

Next, the hemoclip would be deployed by compressing the back of the hemoclip 100 with the firing mechanism 50 and would be secured by closing the locking mechanism 30 on the hemoclip 100. If using the alternative design, the hemoclip 100 would be deployed after the spring holding the hemoclip 100 open is removed.

As shown in, e.g., FIG. 3, once the hemoclip 100 is deployed (via e.g., a catheter) as to encapsulate a desired target site 90, the firing mechanism 50 is activated (as shown in, e.g., FIG. 4) so that the hemoclip 100 is closed onto the target 90 and the latches 30 are locked onto each other. The firing mechanism 50 may include, e.g., a compressive force translated to the firing mechanism 50 (which may include pads, cleats, or other mechanical structures that compress the back of the hemoclip 100). The force may be translated through a string, a wire, an electrical signal, or other mechanism that would apply compressive force to both of the firing mechanisms 50 so that they compress the distal end of the hemoclip 100. Once the hemoclip 100 is locked onto the target 90, the closed hemoclip 100 has a thin enough profile to fit through the set of gates 60 (FIG. 4).

The tunnel 80 may include a suitable length to move onto a target site in vivo and may include a length that is proportionate to the scope being used. For example, a catheter/tunnel used for a gastroscope will be shorter than the length used for colonoscopies. The opening 82 of the tunnel 80 for deploying hemoclip 100 may include a diameter ranging, such as, for example, 2.8 mm for a standard gastroscope, 3.7 mm for a therapeutic gastroscope, 3.2 mm for a pediatric colonoscope, and 3.7 mm for an adult colonoscope. In an embodiment, the diameter may be greater than 3.7 mm and smaller than 3.7 mm.

Figure 6:
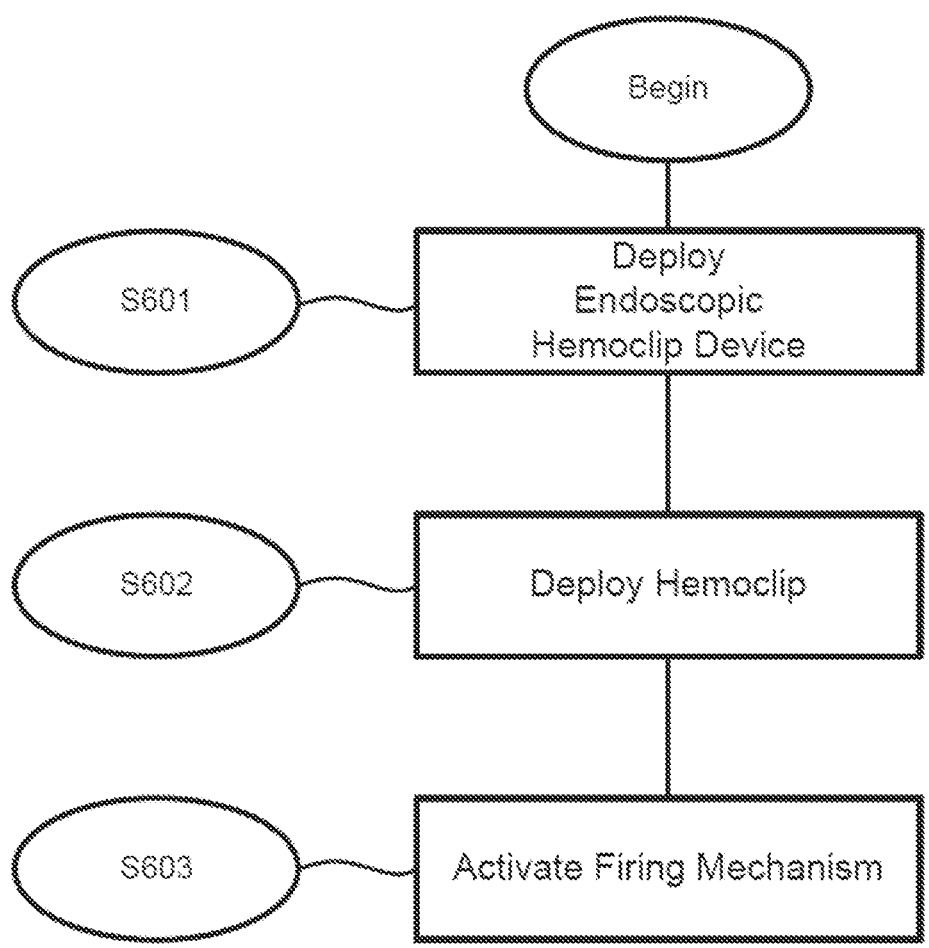
FIG. 6 shows a flow chart illustrating a method for deploying the endoscopic hemoclip device in vivo in accordance with one or more embodiments of the present disclosure.

FIG. 6 illustrates a method of deploying a hemoclip in succession during a surgical procedure, such as, for example, gastroenterology. The method includes deploying an endoscopic device inside the patient to a desired target site (S601); deploying a hemoclip out of the endoscopic device (S602); and activating a firing mechanism as to clamp the hemoclip onto the target site. S602 may include pushing the hemoclip out of the endoscopic device via, e.g., a syringe.

The endoscopic hemoclip device 150 may be assembled in various methods. In some embodiments, the hemoclip 100 and the endoscope 200 may be made of biocompatible or other suitable materials.

Example 2: Hemoclip and Deploying Endoscope

Figure 7:
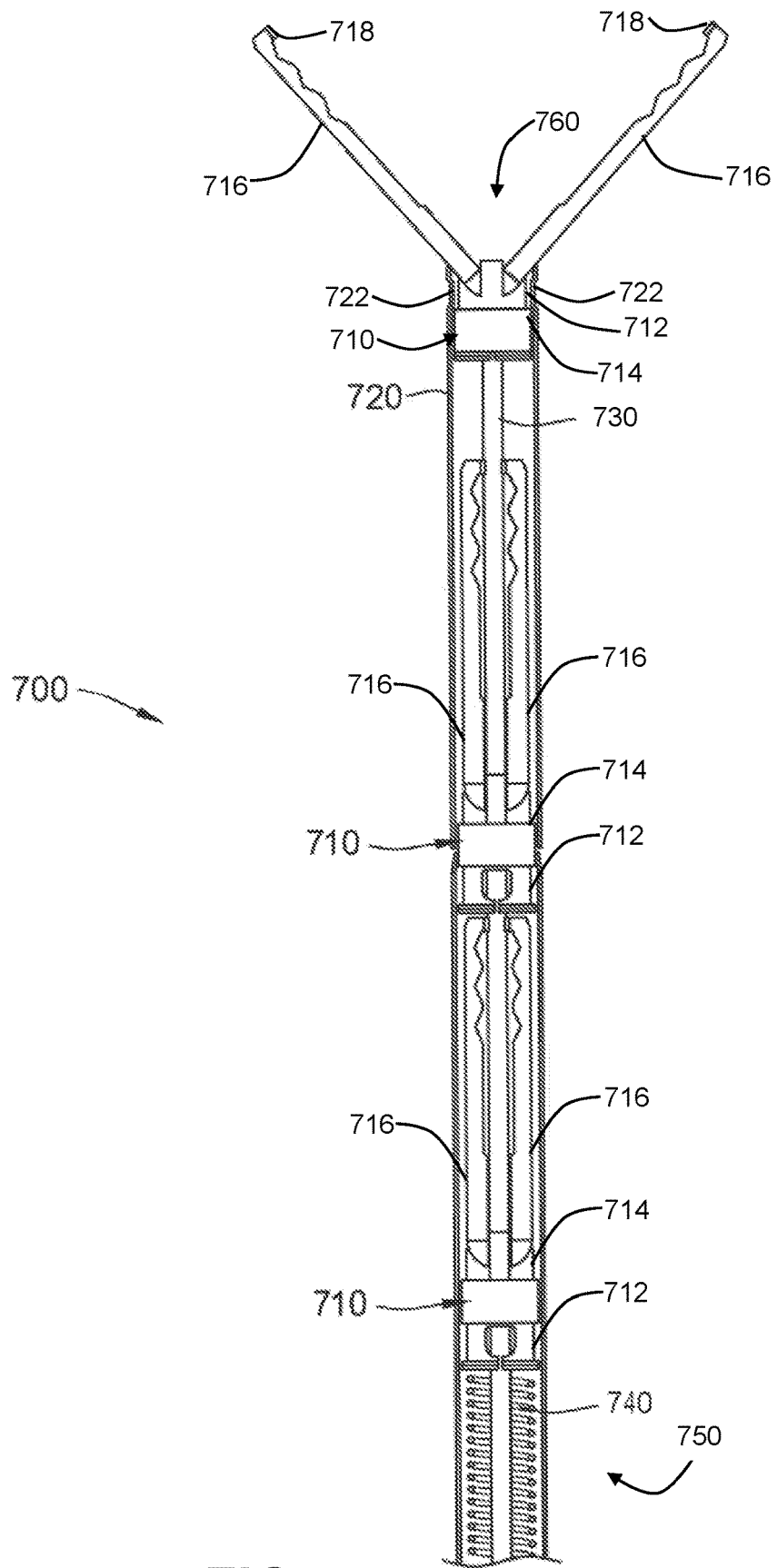
FIG. 7 illustrates a cross sectional view of an endoscope with multiple hemoclip devices arranged in a tunnel of the endoscope in accordance with one or more embodiments of the present disclosure.

FIG. 7 is a cross-section view of an endoscope system 700 according to one or more embodiments of the present disclosure. The endoscope system 700 includes one or more hemoclips 710 arranged within a catheter 720 of the endoscope system 700.

In various embodiments, the catheter 720 may be a tunnel or a lumen in an endoscope, a catheter associated with the endoscope or some other structure that provides a passageway for the one or more hemoclips 710 according to the present disclosure. In one example, the catheter 720 may be an annular tube within the tunnel or the lumen of the endoscope. In another example, when desired for hemostatic purposes, the catheter 720 may be introduced into a working channel of the endoscope (that is, tunnel or lumen of the endoscope). Accordingly, in some examples, the catheter 720 may be configured with a diameter so as to be introduced and navigated into the working channel of the endoscope towards a target tissue. In some other examples, the catheter 720 may be integrated within the endoscope (e.g., where the working channel of the endoscope is the catheter housing the hemoclips or configured as an annular tube within the working channel of the endoscope or an additional channel of the endoscope).

The catheter 720 may include one or more retention tabs 722 for positioning a distal hemoclip at a distal portion of the catheter 720 during deployment. The one or more tabs 722 may prevent the distal hemoclip from being pushed out of a distal opening 760 until proper positioning is achieved.

Each of the one or more hemoclips 710 include a hub 712, a closing ring 714, and a pair of jaws 716. Further, in this example, a distal hemoclip is shown in an open configuration while the remaining hemoclips that are positioned entirely within the catheter 720 are in a closed configuration. The remaining hemoclips are maintained in the closed configuration by the closing ring 714, and further an amount of closure and/or the grasping force of the hemoclips are based on a diameter of the closing ring 714. The various components of a hemoclip of the one or more hemoclips 710 are described below with respect to FIG. 8-10. The one or more hemoclips 710 are positioned serially along an actuation wire 730 within the catheter 720. In one example, the hub 712 of the each of the one or more hemoclips 710 may include a channel through which the actuation wire 730 may pass through. Further, when the jaws 716 are formed as a unitary component, a center portion includes an opening to allow the actuator wire 730 to pass through.

The actuation wire 730 is used to advance and retract the hub 712 by applying pushing or pulling force to the actuation wire 730. Further, inside the catheter 720, the one or more hemoclips 710 may be arranged such that the jaws 716 of a trailing hemoclip positioned below a leading hemoclip (positioned closer to the distal opening of the catheter 720) does not clasp any portion of the leading hemoclip. In one example, the jaws 716 may close around the actuation wire 730; however, there may be a small gap between inner surfaces of the jaws 716 and the actuation wire 730 so as to allow advancement and retractions of the actuation wire 730 without damaging the actuation wire 730. In some examples, distal bent tips 718 (also referred to as distal teeth 718) of the jaws 716 may hold the actuation wire, which may reduce unwanted movements of the hemoclip within the catheter 720 and support positioning of the hemoclip 710 within the catheter 720.

Further, the endoscope system includes a spring 740 at a proximal portion 750 for propelling the one or more hemoclips 710 through the catheter 720 towards the distal opening 760 of the endoscope system 200. One end of the spring 740 may be in contact with a bottom surface of the hub 712 of a distal hemoclip within the catheter 720. In one example, the actuation wire 730 may pass through a central passage formed by the spring 740, and continue to pass through openings (e.g., through the hub 712 and in between jaws 716) in each of the one or more hemoclips 710. In other examples, the spring 740 may be positioned adjacent to the actuation wire 730, and in such cases, optionally, one or more additional springs having the same dimensions and physical properties as the spring 740 may be positioned in order to provide equal distribution of spring force to the one or more hemoclips 710.

In some examples, alternative to the spring 740, other mechanisms (corkscrew, plunger, etc.) may apply force to the hemoclips 710 to push them distally towards the opening 760 in the endoscope system 700 through the catheter 720. In other examples, the actuation wire 730 may advance the hemoclips through the catheter 720 without the spring 740.

Figure 8:
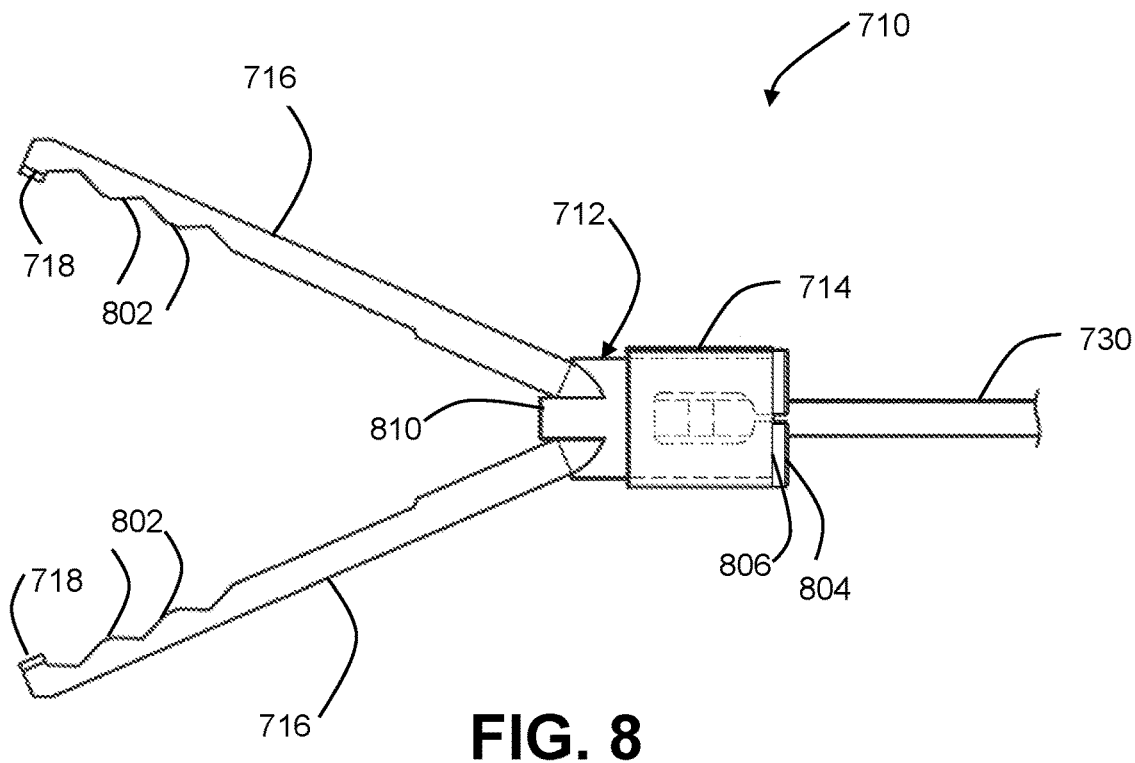
FIG. 8 illustrates a hemoclip system in accordance with one or more embodiments of the present disclosure.

FIG. 8 illustrates a side view of one of the hemoclips 710 according to one or more embodiments of the present disclosure. The hemoclip 710 includes a pair of jaws 716 and is directly coupled to the hub 712. In one example, the jaws 716 may include a plurality of teeth 802 in addition to distal bent tips 718. Further, the hub 712 may be attached to the pair of jaws 716 by passing one of the jaws 716 through an opening on the hub 712. The opening may be formed by tabs 810 or a loop, on the hub 712, for example.

Figure 9:
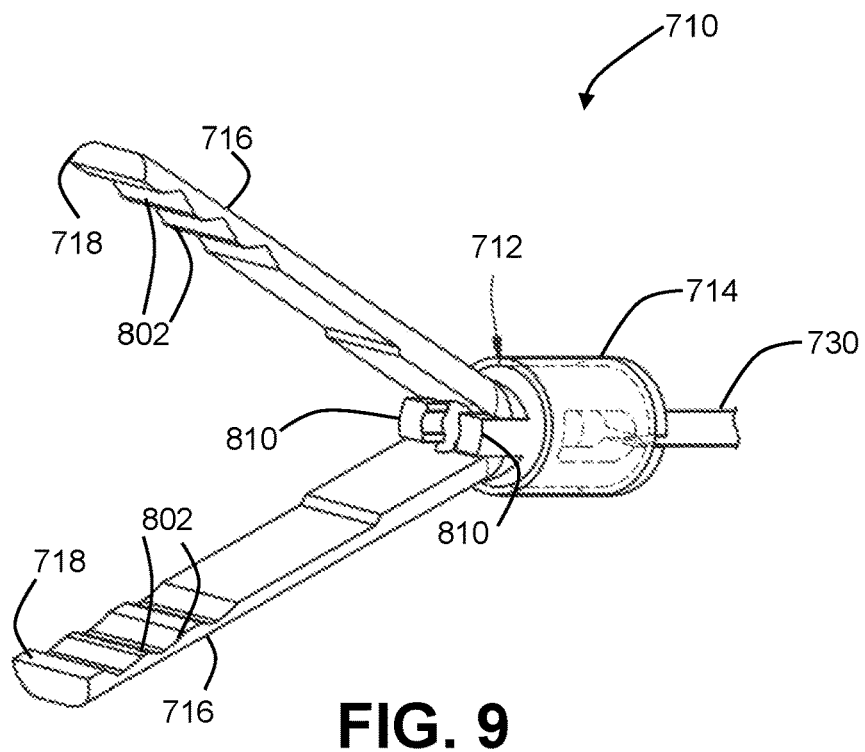
FIG. 9 illustrates a perspective view of a hemoclip system in accordance with one or more embodiments of the present disclosure.

The hemoclip 710 comprises the closing ring 714 configured to be fitted over the hub 712. In this example, the closing ring 714 is a hollow cylinder having a length less than a length of the hub 712. In FIGS. 8 and 9, the portion of the hub 712 that resides within the closing ring 714 is shown in dotted lines. The closing ring 714 may be fitted over the hub 712 so that it may slide longitudinally along a longitudinal axis of a catheter, such as catheter 720 at FIG. 7, over the hub 712 and over the jaws 716. Further, when the hemoclip 710 is in an open configuration, as shown, the closing ring 714 is positioned below an attachment portion of the jaws 716 with the hub 712. The closing ring 714 may not slide over a base portion 804 of the hub 712. In one example, a bottom surface 806 of the closing ring 714 may sit on a base portion 804 of the hub 712 when the hemoclip 710 is in the open configuration. Thus, in one example, the bottom surface 806 of the closing ring 714 is in face-sharing contact with the base portion 804 of the hub 712 when the hemoclip 710 is in the open configuration. In other examples, there may be a small separation between the base portion 804 of the hub 712 and the bottom surface 806 of the closing ring 714 when the hemoclip is in the open configuration. The small separation is less than a distance between the bottom surface 806 f the closing ring 714 and the base portion 804 of the hub 712 when in the closed configuration.

The open configuration enables the jaws 716 to be opened prior to deployment. For example, the hemoclip 720 may be within the catheter and when positioned within the catheter, the closing ring 714 may be positioned over the jaws 716 so as to bring the jaws 716 together to a closed configuration. In particular, the closing ring may be positioned over a portion of the jaws 716 and a portion of the hub 712, including the connection between the jaws 716 and the hub 712. In this closed configuration, the bottom surface 806 of the closing ring 714 is not in face-sharing contact with the base portion 804 of the hub 712. Prior to deployment, the actuation wire 730 engages with the hub 712 and may push the jaws 716 along with the hub 712 through the opening of the catheter at a distal end. In one example, the actuation wire 730 engages with the hub 712 via an opening of the hub, where a distal end of the actuation wire with a retention feature (e.g., a catch, a bulb, a flared end, etc) may be retained within the opening. Thus, when the actuation wire 730 engages with the hub 712, the distal tip of the actuation wire 730 is releasably retained within the opening of the hub. As a result, the jaw 716 and the hub 712 may slide through the closing ring 714 until the base portion 804 of the hub 712 meets the bottom surface 806 of the closing ring 714. Thus, the base portion 804 of the hub 712 stops the hub 712 and the jaws 716 from sliding out of the closing ring 714.

Further, as discussed above, the hub 712 may include a connector 810 through which the jaws 716 are coupled. Additionally, the hub 712 may include one or more flexible tabs at the base portion 804 for holding the actuation wire 730 passing through the hub 712. During deployment, the actuation wire 730 may be able to be pulled out of flexible tabs on the hub 712.

FIG. 9 illustrates a perspective view of the hemoclip 710 connected to hub 712 and actuation wire 730. As illustrated, the hemoclip 710 may be connected to the hub 712 where the jaws 716 of the hemoclip 710 meet. In some examples, the hub 712 may include the connector 810, which may be configured as tabs (as shown at FIGS. 8 and 9) or a loop or other structure that provides a space where a jaw could be passed through, so the hub 712 retains the hemoclip 712 at a pivot, bend, or joint where the jaws 716 meet. In some examples, the connection will permit the hemoclip 710 some freedom of movement with respect to the hub 712. In other examples, the hemoclip 710 may be immobile with respect to the hub 712.

Figure 10A:
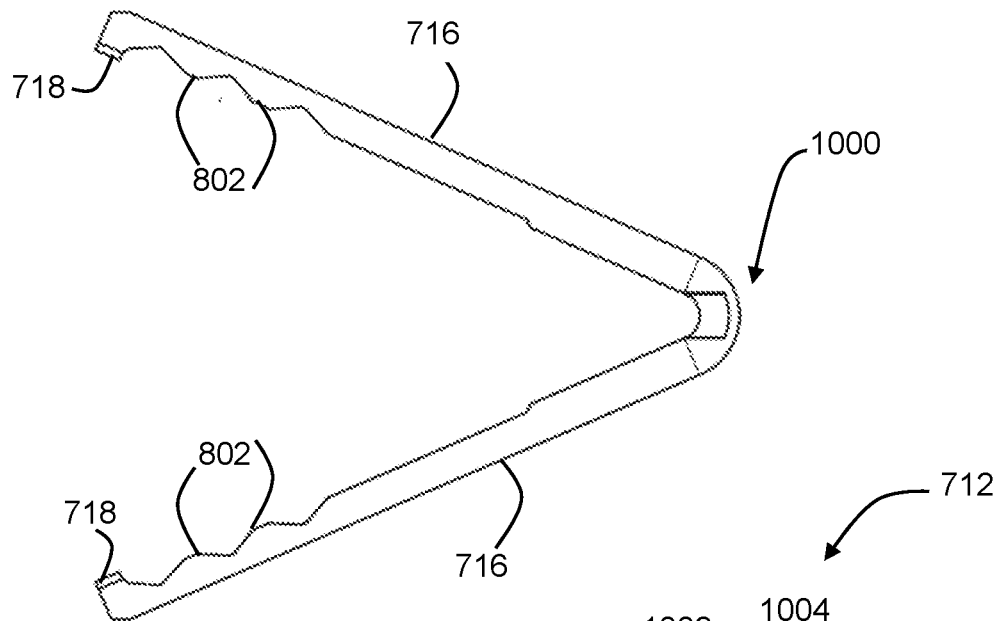
FIGS. 10A and 10B illustrates a pair of jaws and a hub respectively, of an example hemoclip system in accordance with one or more embodiments of the present disclosure.
Figure 10B:
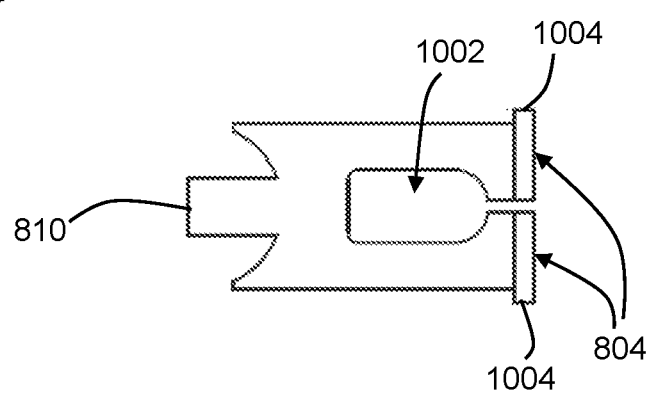

FIG. 10A illustrates a side view of the pair of jaws 716 including teeth 802 and pivot, bend or joint 1000, and FIG. 10B illustrates a side view of the hub 712. In particular, the pair of jaws 716 and the hub 712 are shown separately, before connecting the jaws 716 to the hub 712. The jaws 716, the hub 712, and the closing ring 714 (discussed above at FIGS. 7-9) may be assembled to form a hemoclip. The pivot 1000 connects to the connector 810 of the hub 712. In some examples, the pivot 1000 may be a bend in the hemoclip where the jaws 716 meet, and may be shaped and structured to bias the jaws 716 of the hemoclip open. For instance, the pivot 100 may be made of a metal material that allows the hemoclip's jaws 716 to close when pressure is applied to the jaws 716 (e.g., pressure may be applied via one or more of a closing ring and catheter).

The hub 712 further includes one or more tabs 1004, which releasably retain an actuation wire, such as the actuation wire 730. For instance, the actuation wire may include a catch, bulb, or other protrusion that is retained by the tabs 1004 on the hub 712 within an opening 1002. In some examples, the tabs 1004 may be made of flexible material and bend when the actuation wire is withdrawn and the bulb is withdrawn out of the tabs 1004. In this example, the tabs 1004 may bend sufficiently to allow the bulb to pass through the opening made by the tabs 1004. In other examples, other suitable mechanisms or connections may be utilized between actuation wire and hub 712. For instance, a breakable connection could be used, where either the bulb/wire or a portion of the hub 712 would break. In other examples, a magnetic connection could be utilized between the actuation wire 700 and hub 712.

Figure 11:
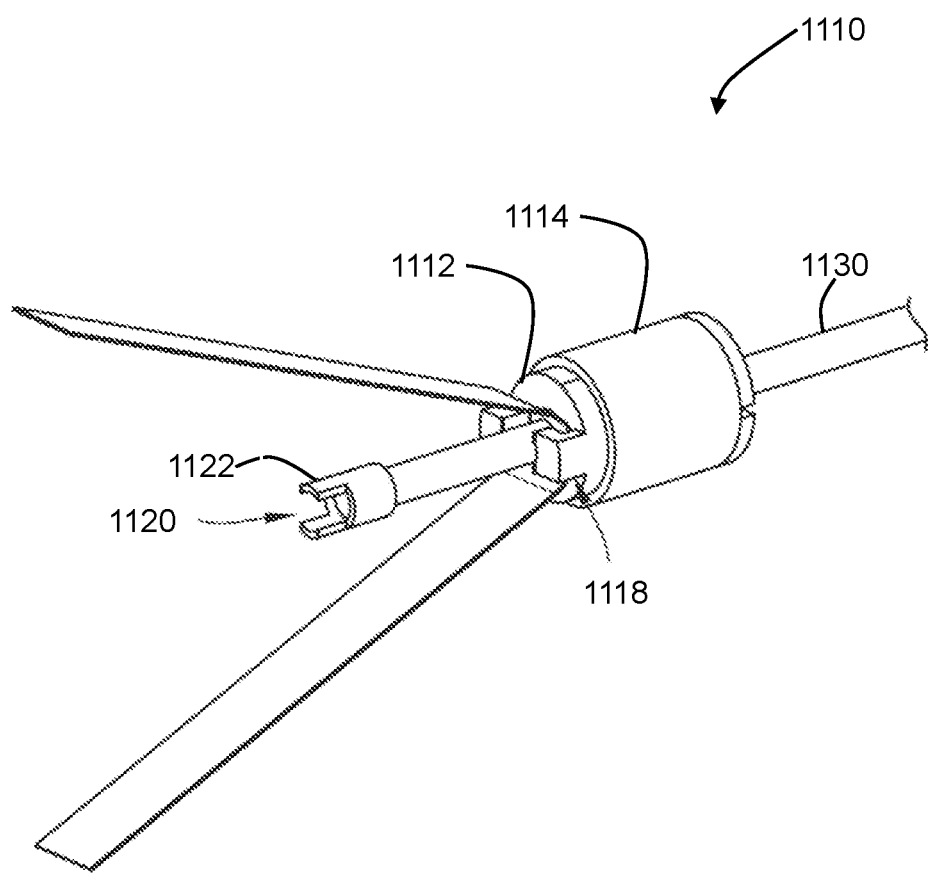
FIG. 11 illustrates an example hemoclip system coupled to an actuation wire in accordance with one or more embodiments of the present disclosure.

FIG. 11 shows a perspective view of a hemoclip 1110 according to one or more embodiments of the present disclosure. The hemoclip 1110 is shown positioned with respect to an actuation wire 1130 that may be utilized for deploying the hemoclip 1110 via an endoscope, for example. The actuation wire 1130 is similar to the actuation wire 730 discussed above. In this example, the actuation wire 1130 includes a catch 1120 at its distal end. In one example, the catch 1120 may be a machined stainless steel, and may be a crimped portion with one or more distal tabs 1122 formed at the distal end of the actuation wire 1130. The actuation wire 1130 engages (e.g., by releasable retention of the distal end of the wire within an opening of the hub) and disengages (e.g., by withdrawing the retained tip out of engagement via flexible tabs on the base portion of the hub, via actuation of a trigger of a handle) the hemoclip 1110 via a hub 1112 of the hemoclip 1110. In particular, the hemoclip 1110 may engage with the catch 1120 of the actuation wire 1130 via the hub 1112. The hub 1112 is similar to hub 712.

In another example, an actuation wire tip 1122 is flared outwards to allow the actuation wire to pass through a base and into a channel of the hub 1112 but not allow it to move forward again, which allows the actuation wire to push the hemoclip forward. Furthermore, the flare acts to provide a moment arm to provide the torque needed to lock and unlock the hemoclip in the end of a catheter (e.g., catheter 720) housing the hemoclip 1110. The flared end of the actuation wire may be wide enough to adequately engage the hub 1112; otherwise, the actuation wire can spin inside the hub. Accordingly, in one example, the actuation wire 1130 may be rotated in one direction (e.g., clockwise), via a handle (described further below), to engage the hemoclip 1110 with a distal portion of the catheter Further, the actuation wire 1130 may be rotated in an opposite direction (e.g., anticlockwise) to unlock or disengage the hemoclip from the catheter. The catch 1120 of the actuation wire may be configured to provide the torque needed to lock or unlock the hemoclip 1110. In some examples, additionally or alternatively, the catheter may be rotated, via the handle, to engage or disengage the hemoclip.

In any example, the actuation wire 1130 is configured to pull or push the hemoclip 1110 through a catheter housing one or more hemoclips. When the hemoclip 1110 is engaged with the actuation wire 1130, the catch 1120 may be directly coupled with the hub 1112 of the hemoclip. As such, the catch 1120 of the actuation wire 1130 may be utilized to pull or push the hemoclip 1110.

Further, when the catch 1120 is engaged with the hub 1112, the actuation wire 1130 may provide rotational motion to the hemoclip 1110. For example, the actuation wire 1130 when engaged with the hub 1112 may allow the hemoclip 1112 to be rotated in order to position the hemoclip at a desired position before deployment.

Further, in one example, when a plurality of hemoclips are positioned within a catheter, such as catheter 780 at FIG. 7, the actuation wire 1130 passes through the plurality of hemoclips, while the catch 1120 of the actuation wire 1130 engages (e.g., connects) with one hemoclip at a time for moving the hemoclip to a distal opening of the catheter. Additionally or alternatively, the actuation wire when engaged may be used for performing one or more of pushing, pulling, and/or rotating operations for positioning the hemoclip with respect to a tissue for deployment. Further, the actuation wire 1130 may be coupled and controlled via a deployment device, such as a handle. Additional details of the deployment device and deployment of a hemoclip will be described below.

Further, the catch 1120 may be configured to be released from the hemoclip 1110 upon deployment. For example, after deployment, the actuation wire 1130 may be withdrawn (that is, pulled in a direction away from the distal opening of the catheter). Due to the positioning of the catch 1120 and/or flexibility of one or more tabs on the hub 1112 engaging the catch 1120, the actuation wire 1130 and the catch 1120 may be configured to slip out of the hemoclip 1110 after deployment.

In this way, the actuation wire 1130 with the catch 1120 is configured to efficiently engage with the hub of the hemoclip, and move the hemoclip towards the opening of the catheter, and further, engage the hemoclip with the catheter. The catheter engaged with the hemoclip can then be rotated via the handle to enable proper positioning of the hemoclip 1110 with respect to a target tissue. During release, the actuation wire 1130 may be pulled out of the hemoclip 1110 by utilizing flexibility of the flexible tabs on the base portion of hub 1112. The catch 1120 is then available to engage with a next hemoclip in the catheter when more than one hemoclip is required to seal the target tissue/wound. Thus, the actuation wire enables proper positioning, release, and sequential deployment of multiple hemoclips.

Further, one or more of the ring 1114 (for closing the jaws of the hemoclip 1110) and the hub 1112 may be made from stainless steel so that it can remain relatively light (in comparison to heavier metals). Other suitable materials could be utilized including other metals and plastics. Furthermore, the example hemoclip 1110 is shown with both jaws having flat inner surfaces, it will be appreciated that other shapes of the jaws may be used, such as jaws with teeth as described above, or jaws with convex and concave curved portions as described below, or any other suitable jaw configuration.

Figure 12:
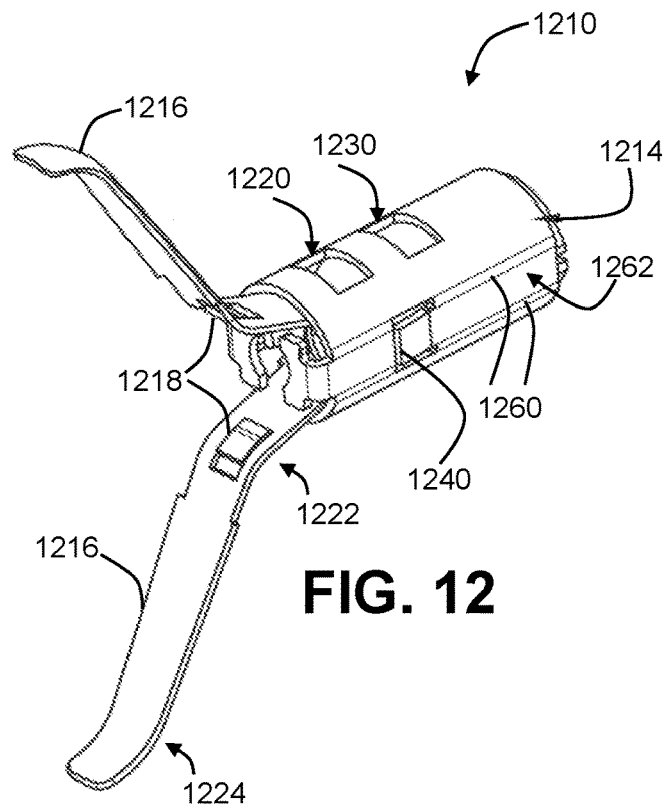
FIG. 12 illustrates another example hemoclip system in accordance with one or more embodiments of the present disclosure.
Figure 13:
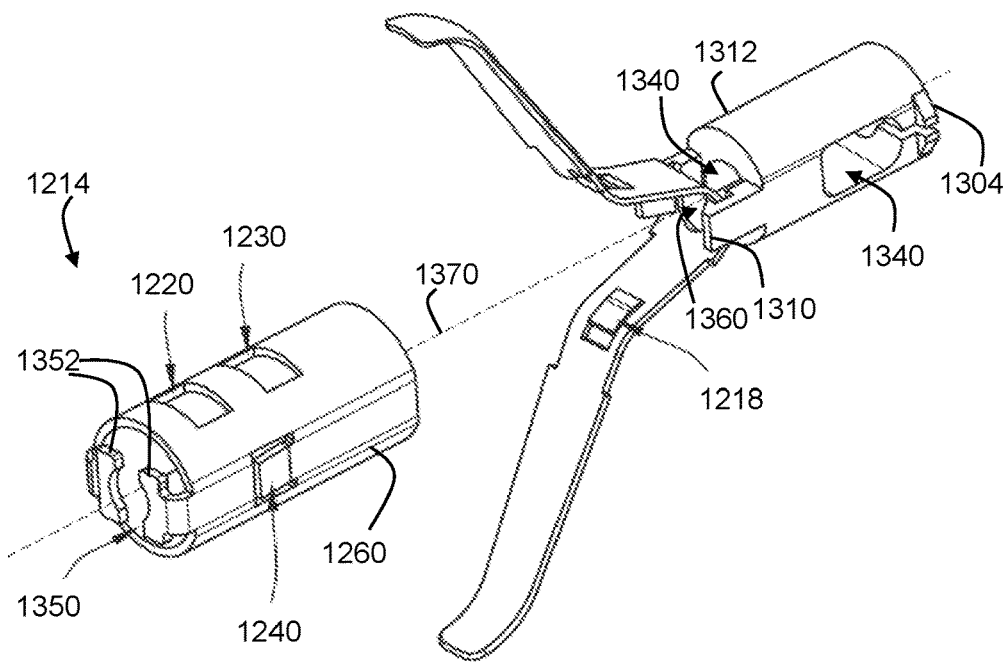
FIG. 13 illustrates the hemoclip system of FIG. 12 with a closing ring separated from the hub.

Next, referring to FIGS. 12 and 13 simultaneously, FIG. 12 shows a perspective view of a hemoclip 1210 including a closing ring 1214 and FIG. 13 shows the closing ring 1214 separated from a hub 1212 of the hemoclip 1210, according to one or more embodiments of the present disclosure.

The hemoclip 1210 includes the hub 1212 and a pair of jaws 1216. Each of the pair of jaws 1216 includes a first curved portion 1222 and a second curved portion 1224 near a distal end of the hemoclip 1210, where the first curved portion 1222 is curved outwards and the second curved portion 1224 is curved inwards such that the tips of the jaws 1216 face each other. Further, each of the pair of jaws 1216 includes a locking tab 1218 that is configured to directly couple with a corresponding jaw locking window 1220 of the closing ring 1214. The locking tab 1218 is located towards a proximal end of each jaw at the first curved portion 1222. During deployment, the locking tab 1218 of each jaw couples with the corresponding jaw locking window 1220 of the closing ring 1214 in order to close the jaws (e.g., to bring two tissue surfaces to close). Further, the position of the locking tab 1218 along with the position of the locking window 1220 on the hub allows the jaws to close with sufficient force to bring the target tissues together during deployment and remain closed after deployment. In this way, the hemoclip 1210 is attached to a target tissue with improved efficiency.

As discussed above, each locking tab 1218 is configured to couple with the corresponding jaw locking window 1220 on the closing ring 1214. As such, the closing ring 1214 includes the jaw locking window 1220 and further includes a second jaw locking window (not shown) positioned opposite to the jaw locking window 1220 on the closing ring 1214. While the present example shows the jaw locking window 1220 having a rectangular curved opening, the opening may be circular, oval, oblong, or any suitable geometric shape configured to receive a corresponding protruding tab on a jaw. In one example, both the jaw locking window may include openings of same shape (e.g., both rectangular openings, both circular openings, etc.). In other examples, the jaw locking windows may have different shaped openings (e.g., a first window may have a rectangular shaped opening while a second opposite window have a circular shaped opening) and the locking tabs on the jaws may be configured to couple with different shaped openings.

Further, a number of jaw locking windows on the closing ring 1214 may equal a number of jaws of the hemoclip 1210. As a number of increases, a number of locking windows on the closing ring 1214 may also increase. In some examples, at least one jaw of two or more jaws may include the jaw locking tab, and therefore, at least one jaw locking window may be provided on the locking. As such, a number of locking windows on the closing ring may be based on a number of jaw locking tabs on the hemoclip 1210.

Further, while the present example shows the two jaw locking windows positioned opposite each other, and having a same central circumferential axis of the cylindrical closing ring passing through a center of each window (e.g., central meeting point of the diagonals of a rectangular window), it will be appreciated that in some examples, the two jaw locking windows may be positioned opposite and offset with respect to each other. In this case, the centers of each jaw locking window may pass through different circumferential axes of the closing ring, and accordingly, the locking tabs 1218 on the jaws may be positioned in an offset manner to allow coupling with the jaw locking windows.

Furthermore, until the jaws are locked with the closing ring 1214, the closing ring 1214 may slide longitudinally over the bottom portion of the jaws in a direction towards the locking tabs 1218 or in an opposite direction away from the locking tabs 1218 to close or open the jaws respectively. Further, until the jaws 1216 are locked with the closing ring, the closing ring 1214 may be advanced and/or retracted as many times as desired to open and close the jaws. In this way, the movement of the closing ring with respect to the jaws enable adjustment of position of the jaws with respect to the target tissue. In one non-limiting example, for a larger wound, the jaws may be opened wider (e.g., to a fully open configuration) before clasping the tissue; while for a smaller would the opening of the jaws may be reduced (e.g., to a partial open configuration) by moving the closing ring over the jaws but not locking the jaws. When the jaws are locked with the closing ring, the hemoclip 1210 is in a fully closed configuration. The catheter and/or actuation wire may be adjusted to adjust position of the closing ring 1214.

The closing ring further includes a catheter interface window 1230 positioned below one of the jaw locking windows 1220. The catheter interface window 1230 is configured to receive a retention tab of a catheter of an endoscope. Details of the catheter and the retention tab are discussed below with respect to FIGS. 15A-15F. As an example, the catheter window 1230 may interface with the retention tab on the catheter (for instance, the catheter 720 of the endoscope) to allow the endoscope to lock onto the ring 1214. This allows the catheter 720 of the endoscope to push and pull the ring 1214, which would open and close the jaws 1216 of the hemoclip 1210 as described further below.

In this way, by engaging the closing ring 1214 with the catheter and moving the closing ring 1214 to close and subsequently lock the jaws, during deployment, the target tissue may be closed without having to continuously pull the hemoclip back. Thus, damage to the tissues is reduced as the tissues are brought together by closing the jaws and not pulled by the jaws during deployment. Further, movement of the jaws of the hemoclip with respect to the tissues is reduced which provides greater control and accuracy in positioning of the hemoclip.

Further, the other jaw locking window (not shown) that is opposite to the jaw locking window 1220 may additionally function as a second catheter interface window when the closing ring 1240 releasably connects with the catheter during deployment. Details of deployment of the hemoclip 1210 from a catheter using the closing ring 1214 will be described below with respect to FIGS. 16A-17G. Jaw and catheter interfacing features of the closing ring 1214 are described below with respect to FIGS. 14A and 14B.

As discussed above with respect to the locking window 1220, the interface window 1230 may be openings in the closing ring 1214 that are rectangular, oval, circular, or otherwise suitably shaped receive a corresponding protruding tab on the catheter. In other examples, the closing ring 1214 may include protrusions or tabs while the catheter includes corresponding openings to interconnect with the protrusions or tabs on the closing ring 1214. In some other examples, a hub 1312 may include tabs/protrusions and the windows or openings may be on the catheter. The hub 1312 holds the jaws 1216 and engages with an actuation wire via a catch (e.g., actuation wire 1130) that allows the hemoclip to be pushed, pulled, or rotated during deployment. The hub 1312 is similar to hub 712 discussed at FIGS. 7-10.

The closing ring 1214 further includes an advancement stop tab 1240 positioned at a flat portion 1262 having beveled edges 1260. During deployment, when the hemoclip 1210 is advanced to a distal opening of the catheter, the flat portion 1262 allows a portion of the closing ring 1214 to travel past a catheter tab on the catheter until the advancement stop tab 1240 is stopped by catheter the tab. Thus, the advancement stop tab 1240 is configured to prevent the hemoclip 1210 from being advanced too far prior to the catheter engaging the closing ring 1214. Additionally, the advancement stop tab 1240 enables proper positioning and alignment of the catheter tab with respect to a catheter alignment window, and thereby, allows quick and seamless engagement of the catheter with the closing ring (that is, positioning and connection of catheter with the closing ring).

Also illustrated is the tissue guard 1350, that prevents tissue from being pinched inside of the closing ring 1214 during deployment of the hemoclip 1210. The tissue guard may be a pair of tabs 1352, or other protrusions or features that are connected to a rim of the closing ring 1214 and bend out in front of a ring opening in the closing ring 1214. The tissue guard 1350 may include an opening wide enough for an actuation wire, such as the actuation wire 1130 with the catch 1120, to fit through. Additionally, the tissue guard 1350 may be configured so that the jaws 1216 of the hemoclip 1210 can protrude through the same ring opening of the closing ring 1214.

When the hemoclip is arranged within the catheter and enclosed by the catheter, the closing ring is positioned partly over the jaws 1216 without engaging the jaw locking tabs 1218 with the jaw locking windows 1220. Further, when arranged within the catheter, the jaws 1216 are brought to a near closing position by the inner walls of the catheter. When the hemoclip is moved to the distal opening of the catheter, the closing ring 1214 is configured to fit over the hub 1312 such that a bottom portion of the closing ring 1214 rests on a base portion 1304 of the hub 1312. Further, the hub 1312 and the closing ring 1214 are aligned on a longitudinal axis 1370 such that a passage is provided for an actuation wire in the hemoclip 1210. The passage may start from an opening of the base 1304, continue through a channel 1340 of the hub 1312 and through a distal opening 1360 of the hub 1312 that aligns with the ring opening between the tissue guards 1350 of the closing ring and aligns with a central jaw opening where the jaw fits on to the hub 1312.

The hub 1312 includes jaw supports 1310 for positioning and engaging the jaws 1216 with the hub 1312. Further, as discussed above with respect to FIG. 10, the hub 1312 may include flexible tabs through which the actuation wire with the catch or bulb or the like may be pulled out during deployment to release the hemoclip 1210 from the catheter (e.g., after the hemoclip is attached to a target tissue).

Figure 14A:
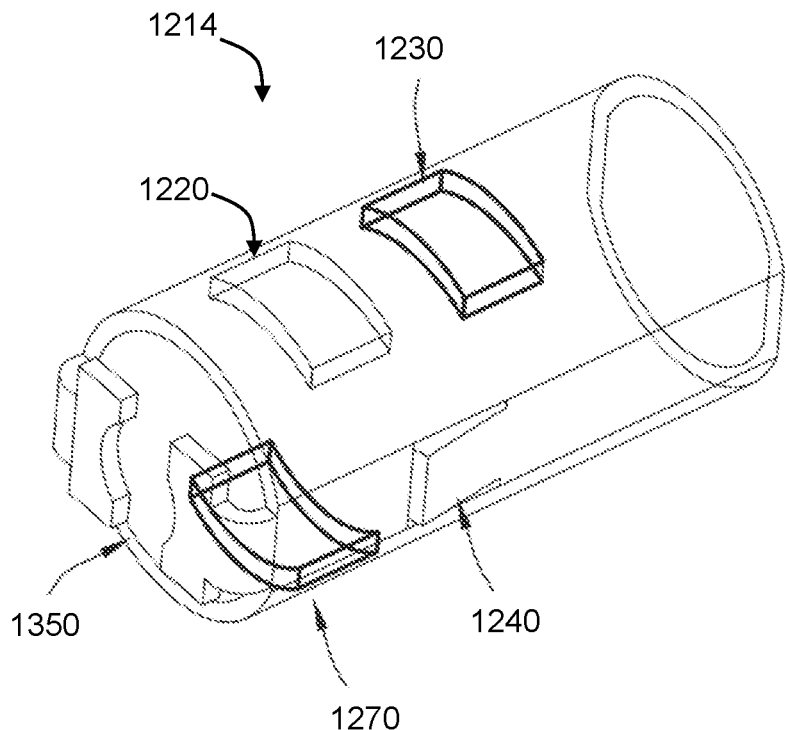
FIG. 14A illustrates a transparent and perspective view of an example of a closing ring in accordance with one or more embodiments of the present disclosure.

FIG. 14A illustrates a perspective view of the closing ring 1214 showing the catheter interface window 1230 and a common window 1410 in thicker lines depicting a configuration of the closing ring 1214 when the common window 1410 is used for interfacing with the catheter. For example, during deployment of a hemoclip, such as hemoclip 1210, actuation wire, via a catch, may engage with a hub of the hemoclip, such as hub 1314. Further, when the hemoclip is within the catheter, the closing ring 1214 may enclose a portion of the jaws and the hub without engaging with the jaws. After engagement of the actuation wire with the hub, the actuation wire may advance the hemoclip (that is, hub, jaws, ring) towards a distal opening of the catheter. The catheter may include a pair of retention tabs (described below at least at FIGS. 15A-15F), and as the hemoclip is advanced, it is stopped by one of the pair of retention tabs contacting the advancement stop tab 1240 on the closing ring 1214. The advancement stop tab 1240 is configured to stop the closing ring 1214 from moving out far beyond windows 1230 and 1270 that engage with the catheter, while allowing the jaws to be opened (and not brought together by the catheter or the closing ring 1214) outside of the catheter tube. Additionally, the advancement stop tab 1240 aligns the closing ring 1214 with respect to the catheter such that with a single subsequent operation (e.g., rotation of the catheter tube by a threshold degree), the retention tabs on the catheter can interface with windows 1230 and 1270 of the closing ring 1214. When the retention tabs are engaged (that is, connected) with the windows 1230 and 1270, the jaws are in an open configuration and outside of the distal opening of the catheter tube. Further, the closing ring 1214 is configured with a single advancement stop tab 1240. However, embodiments where the closing ring includes more than one advancement stop tabs are also within the scope of the present disclosure.

Further, the catheter interface window 1230 and the common window 1270 are positioned according to positions of the retention tabs on the catheter. Thus, in one non-limiting example, as shown, the catheter interface window 1230 and the common window 1270 are positioned opposite each other and offset according to position (that is, opposite and offset position) of retention tabs on the catheter. Further, the offset positioning of the retention tabs on the catheter and the windows 1230 and 1270 allows the ring to be moved out of engagement with the catheter by rotating the catheter.

Figure 14B:
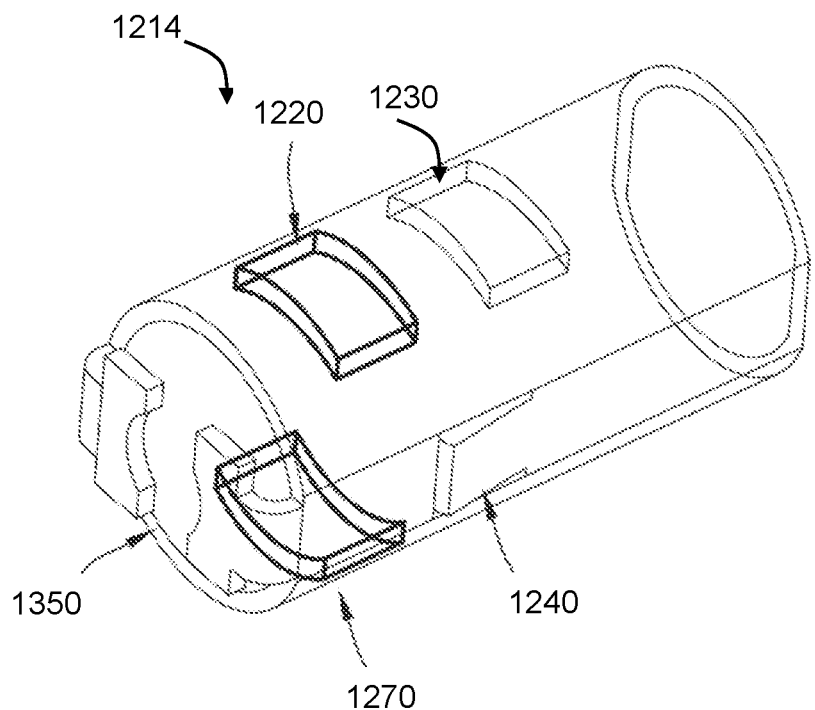
FIG. 14B illustrates another transparent and perspective view of closing ring of FIG. 14A.

Next, FIG. 14B illustrates another perspective view of the closing ring 1214 showing windows (in thicker lines) that are used for locking jaws, such as jaws 1216 at FIGS. 12 and 13. In this example, the common window 1270 may also be used to engage with a locking tab of a jaw, such as the locking tab 1218 of one of the jaws 1216. Further, the ring includes the jaw locking window 1220 for engaging interfacing another jaw 1216 via its locking tab 1218. Thus, windows 1220 and 1270 may be used for engaging and bringing the jaws together in a closed configuration during deployment. For example, during deployment, when the hemoclip is in the open configuration, the catheter interface window 1230 and the common window 1270 are engaged with the retention tabs of the catheter. Further, by one or more operations that will be further discussed below (e.g., rotation and advancement of the catheter), the retention tabs move out of engagement with the catheter. Once the closing ring 1214 and the catheter are disengaged, the actuation wire may be pushed and/or pulled to engage the jaws with the windows 1220 and 1270 to lock the jaw. Additional details of engaging the different windows during deployment will be described below at FIGS. 16A-18C.

In some examples, the closing ring 1214 may include two interface windows and one locking window. In other examples, there may be one interface window and multiple locking windows (for instance to lock onto both jaws 1216) or other combinations.

FIG. 15A shows a side view of a catheter 1530 including one or more hemoclips, such as hemoclips 1210, and configured to deploy one or more hemoclips at a target tissue, according to one or more embodiments of the disclosure. The catheter 1530 includes a distal portion 1520 comprising one or more retention tabs 1510. An enlarged view of the distal portion 1520 is shown in FIG. 15B and a front view of the endoscope tube (when viewed from the distal end) is shown at FIG. 15C. Further, a side perspective view of the distal portion 1520 is shown at FIG. 15D. The one or more retention tabs 1510 may protrude inside the catheter 1530.

At least one retention tab of the one or more retention tabs 1510 may contact an advancement stop tab of a closing ring of the hemoclip, such as the advancement stop tab 1240 of the closing ring 1214 of the hemoclip 1210. Thus, the one or more retention tabs 1510 may stop the hemoclip from moving past a desired position in the catheter 1530. Further, the position of the retention tab 1510 that stops the closing ring from moving past the desired position may be such that when the hub is moved distally via the wire or when the closing ring and the catheter (e.g., after engagement) are moved backwards, it allows the jaws 1216 to flare open. In the example catheter 1530 illustrated in FIGS. 15A-15D, two retention tabs 1510 are shown. The retention tabs are positioned opposite and offset from each other so as to engage with the catheter interfacing windows, such as catheter interfacing window 1230 and common window 1270 discussed above at FIG. 14A. Thus, in this example, the distal retention tab 1510 may contact the advancement stop tab 1240. Further, during deployment, after the hemoclip is stopped by the retention tab 1510, the catheter may be rotated in order to align engage each of the retention tabs 1510 with corresponding windows (that is, windows 1230 and 1270) that are configured to interface with the catheter.

In this way, the retention tabs 1510 of the catheter 1530, and the advancement stop tab 1240 and the windows 1230 and 1270 on the closing ring 1214 enable proper positioning of the hemoclip at the distal portion during deployment.

While the above example shows two retention tabs including a distal retention tab and a second retention tab offset from the distal retention tab and opposed to the distal retention tab, in one example, a single retention tab may be used for stopping the advancement of the closing ring and engaging with a window of the closing ring. Further, in some examples, more than two retention tabs may be used. As a non-liming example, three retention tabs separated by 120 degrees and offset from each other may be provided on the catheter. As another non-limiting example, three retention tabs separated by 120 degrees and positioned aligned on a same circumferential axis may be provided on the catheter. Accordingly, the closing ring may be configured with corresponding number of windows (or any suitable interface) for engagement with the catheter. Further, the position of the windows on the closing ring may be based on offset or aligned positions of the retention tabs.

Figure 15E:
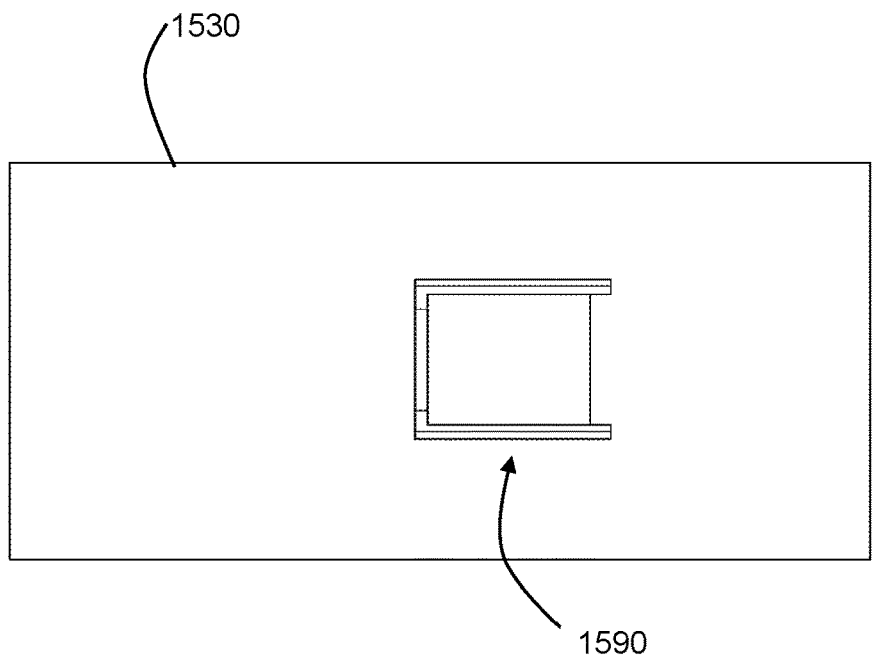
FIG. 15E illustrates an example distal portion of a catheter in accordance with one or more embodiments of the present disclosure.
Figure 15F:
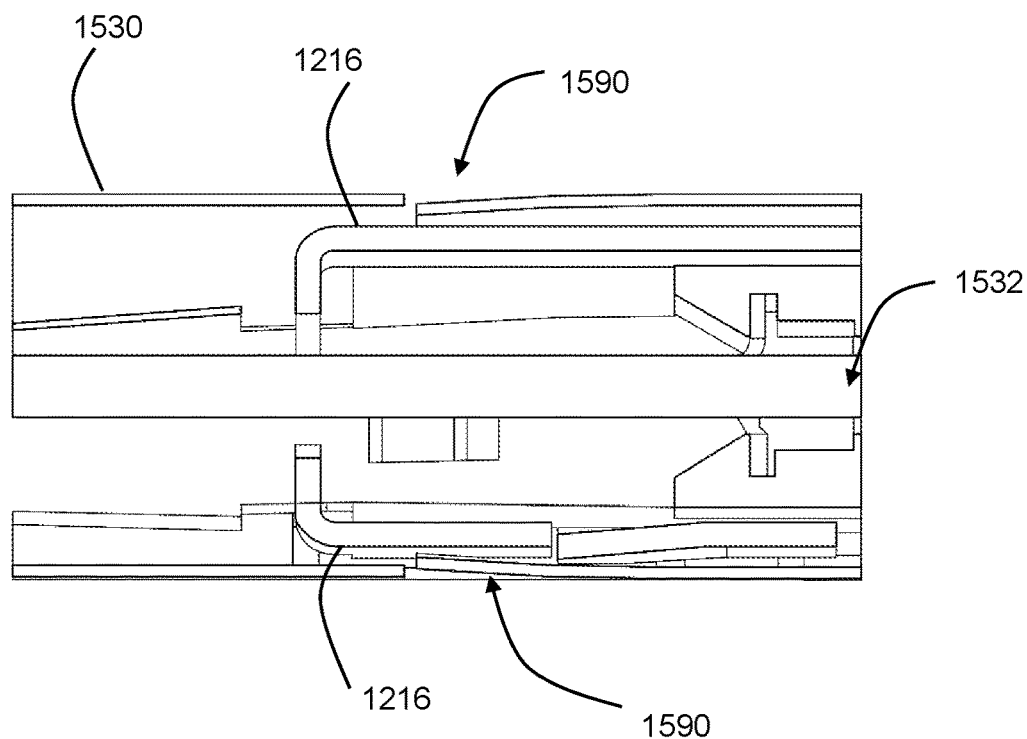
FIG. 15F illustrates a side view of the distal portion shown in FIG. 15E.

FIG. 15E illustrates another enlarged view of another embodiment of retention tab 1590 and FIG. 15F illustrates a cross sectional view of the catheter 1530 including the retention tab 1590. Here the retention tabs 1590 are not offset and lie on the same circumferential axis of the catheter 1530. As discussed above, the retention tab 1590 on the catheter 1530 aligns angular position of the hemoclip 1210 by fitting into the flat portion (e.g., flat portion 1262) on the closing ring 1214 illustrated in FIGS. 12-14B.

In one example, the catheter 1530 may include one or more additional retention tabs along a length of the catheter 1530. For example, one or more of the additional retention tabs may retain each hemoclip assembly at respective desired positions in the catheter tube 1530, such that it is ready to be engaged by the wire 1532 after deployment of previous hemoclips. In another example, in addition to the distal retention tabs that are used for deploying the hemoclip, a second or a second pair of retention tabs may be positioned at a desired distance from the distal retention tabs. In some examples, this position is 5, 6, 7, 8, 9, 10, 11, 12, 13, 14, 15 cm, or other suitable distance back from the distal end, which serves to prevent stacked hemoclips from affecting the flexibility of the most distal end of the catheter tube.

Deploying Hemoclips

The following schematically illustrates examples of methods utilized to deploy hemoclips 1210 as described in the example described above at FIGS. 12, 13, 14A and 14B, and catheter 1530 described at 15A-15F. Accordingly, variations may be performed that involve different steps and mechanical features.

Figure 16A:
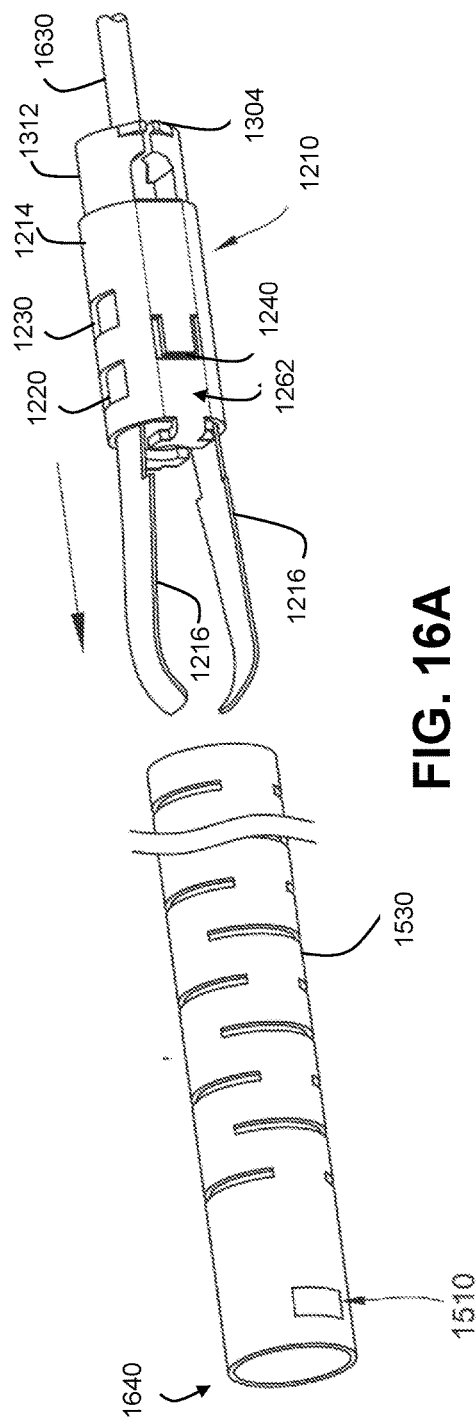
FIG. 16A illustrates an example of a perspective view of a catheter and a hemoclip system in accordance with one or more embodiments of the present disclosure.

FIG. 16A illustrates the first step in deploying hemoclips. Prior to initiating deployment of a hemoclip, a plurality of hemoclips may be assembled within the catheter 1530. In one example, the hemoclip 1210 may be assembled using the jaws 1216, the hub 1312, and the closing ring 1214. For instance, the jaws 1216 of the hemoclip 1210 are loaded onto the hub 1312, or the hub 1312 is connected to the jaws 1216 of the hemoclip 1210. Additionally, the closing ring 1214 is loaded onto the hub 1312. Upon assembly, the hemoclip 1210 is loaded into the catheter 1530 or a channel of an endoscope. In some examples, the hemoclip 1210 may come preconfigured/assembled and loaded into the catheter 1530 or the channel of the endoscope. The present example in FIG. 16A shows the hemoclip 1210 separately from the catheter 1530 for purposes of clarity. Further, the hemoclip 1210 may be a distal hemoclip (that is, a hemoclip closest to the distal opening of the catheter 1530).

Additionally, an actuation wire 1630 may be connected to the hub 1312. The actuation wire may be similar to the actuation wire 1130 including a catch 1120 discussed at FIG. 11. Accordingly, a hemoclip assembly may comprise a hemoclip coupled to an actuation wire within a catheter, or a hemoclip positioned with respect to an actuation wire within a catheter, where the hemoclip comprises a tissue clipping unit (that is, a pair of jaws) connected to a hub and a closing ring configured to movably fit over the hub.

During deployment, the actuation wire 1630 is engaged with the hemoclip 1210. For example, a hemoclip loading button on a handle may be actuated to engage a hub 1312 of the hemoclip 1210 with a distal end (e.g. catch) of the actuation wire 1630, where the handle is configured to operate the hemoclip and the catheter during deployment. Using the actuation wire 1630, the hemoclip 1210 is advanced to a distal end 1640 of the catheter 1530 until the advancement stop tab 1240 contacts retention tab 1510 preventing the hemoclip 1210 from advancing further. In this way, the hemoclip 1210 is positioned with respect to the catheter 1510 at the distal portion.

Further, as discussed above, flat portion 1262 allows the hemoclip 1210 to move past the retention tab 1510 until the advancement stop tab 1240 meets the retention tab 1510. In one example, the flat portion 1262 may be configured with tracks that allow the retention tab 1510 to slide past and thus, may have complementary geometry to stops 1510, or be sized and configured to allow stops 1510 to slide past.

Figure 16B:
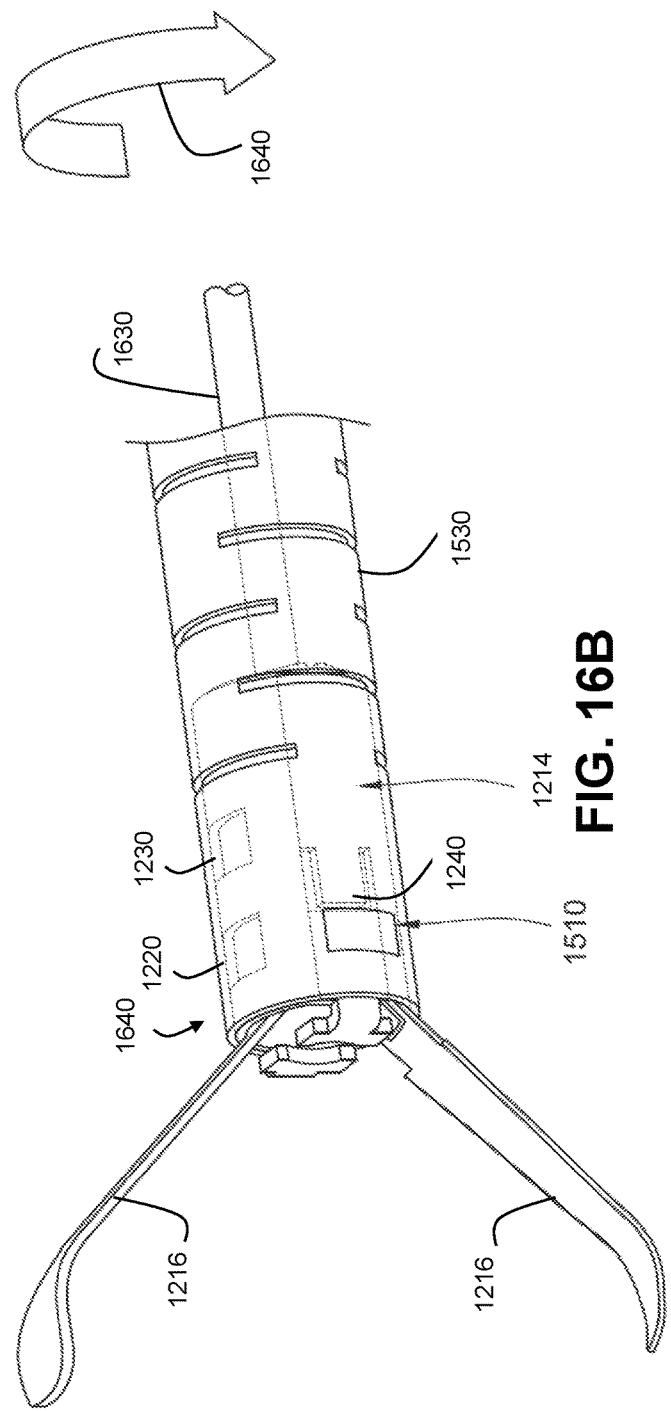
FIG. 16B illustrates an example of a perspective view of the hemoclip system of FIG. 16A inserted into the catheter.

FIG. 16B shows the hemoclip 1210 at the distal end 1640 at a position where the advancement stop tab 1240 is in direct contact with retention tab 1510. Further, the actuation wire 1630 may further advance the hub 1312 without advancing the closing ring 1214 (as the closing ring 1214 is stopped by the retention tab 1510) so as to push the jaws out further. As a result, the jaws 1216 are not retained in a close configuration by the closing ring and are opened. Further, the hub 1312 is configured with a base portion that stops the hub 1312 from sliding out of the catheter before deployment. Further, the tissue guards prevent the hub 1312 and jaws sliding out of the catheter 1530. Next, as indicated by block arrow 1640, catheter 1530 may be rotated 90 degrees or other suitable angle depending on the configuration of the mechanical interface features (e.g., position of the windows that interface with the retention tabs) on the hemoclip assembly to engage the retention tabs 1510 with the catheter interface window 1230 and 1270 (not shown in FIG. 16B). In one example, a handle (discussed further below at FIGS. 22-26) may be coupled to the hemoclip assembly and configured to control movements (rotational and/or linear) of the actuation wire 1630 and the catheter 1530 to engage one or more windows on the closing ring with corresponding one or more retention tabs on the catheter. In this example, the handle may allow rotation of the catheter 1530 by 90 degrees to align a first window (e.g., window 1270) with the retention tab 1510 depicted closer to the distal end 1640 and at the same time align catheter interface window 1230 with a second retention tab (not shown) that is opposed and offset with respect to the distal retention tab 1510.

Figure 17A:
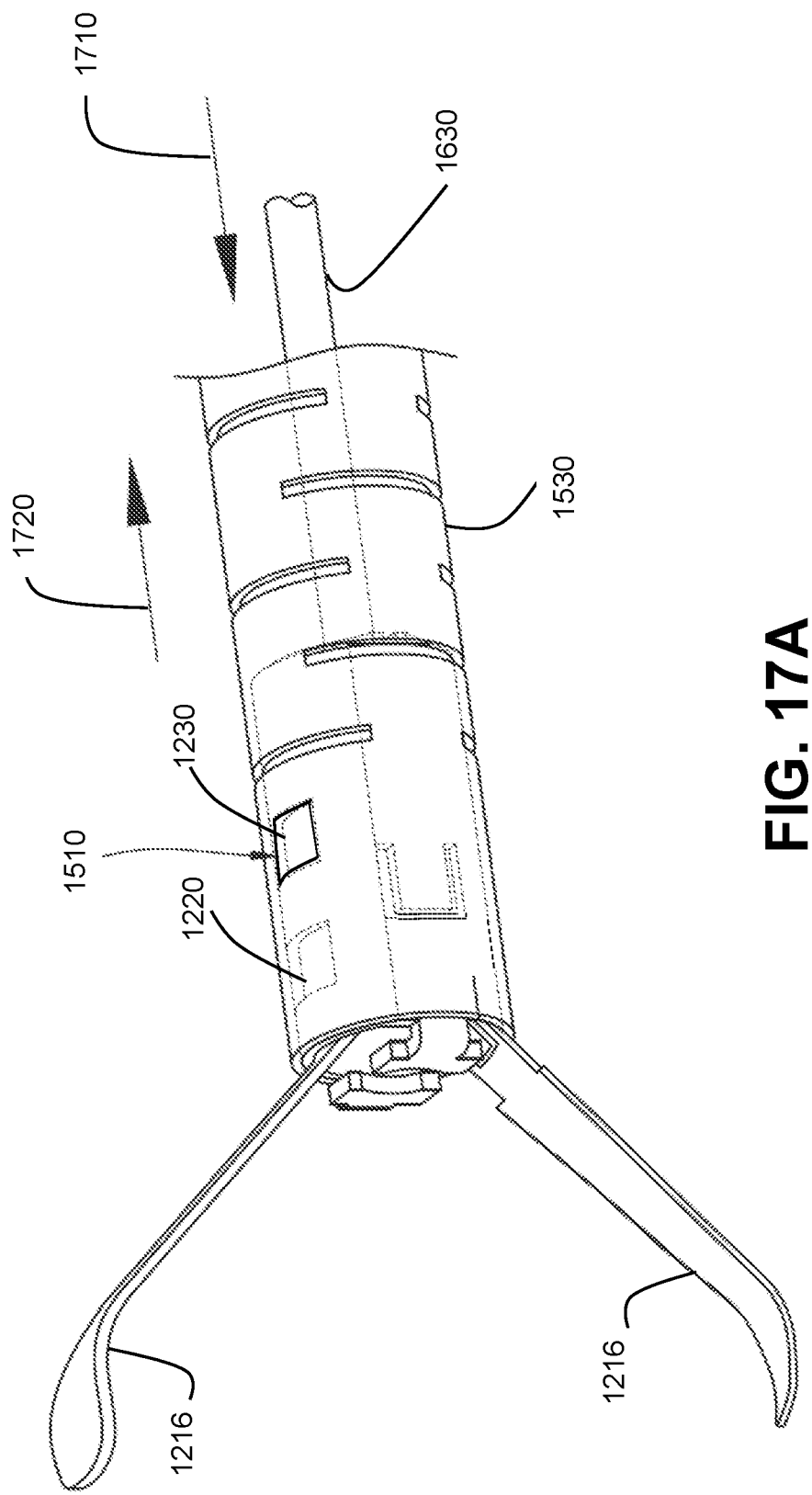
FIG. 17A illustrates an example of a perspective view of the hemoclip system of FIG. 16A inserted in the catheter and being retracted to close the jaws.
Figure 17B:
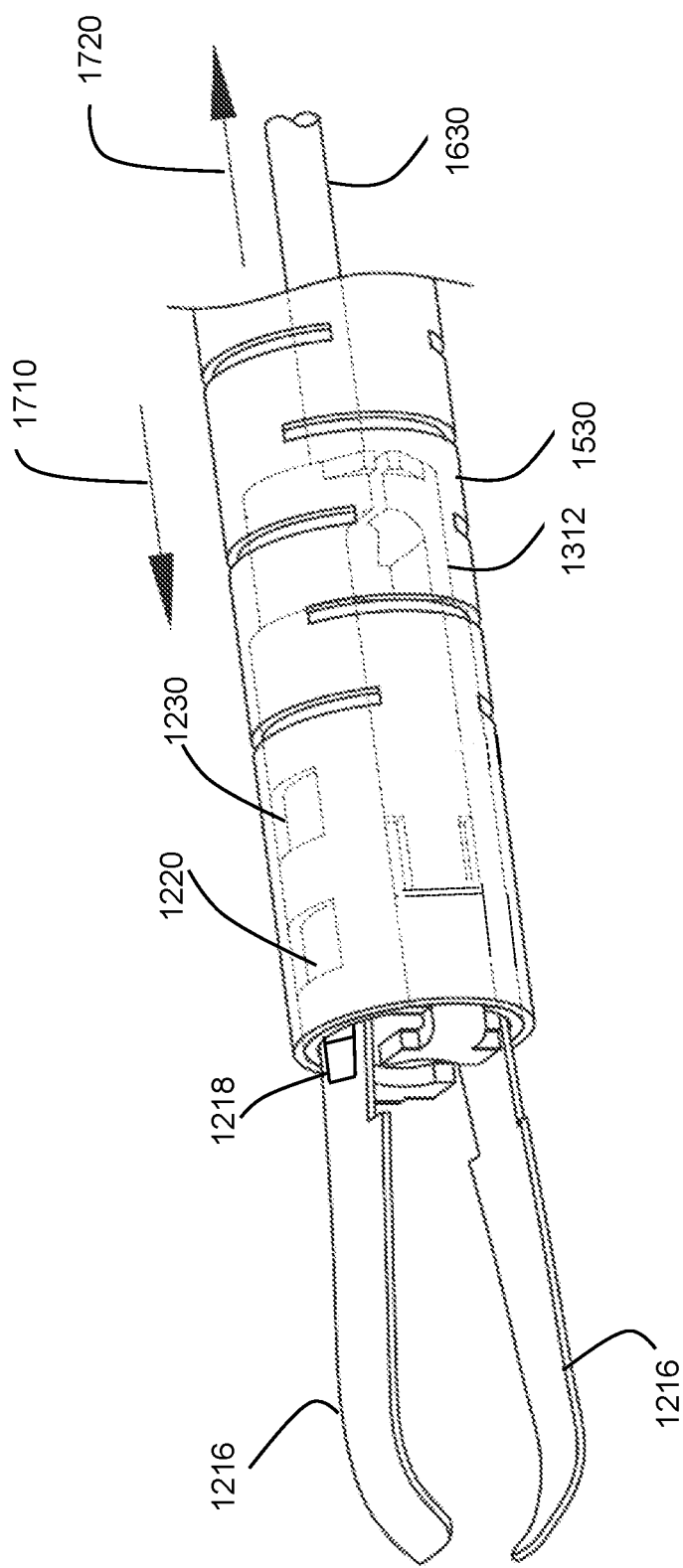
FIG. 17B illustrates an example of a perspective view of the hemoclip system of FIG. 16A inserted in the catheter with the jaws in a closed configuration.

FIGS. 17A and 17B illustrate movement of the hemoclip 1210 after engagement of the retention tabs with corresponding interface windows on the catheter. Once engaged, movement of the position of the catheter 1530 of the endoscope with respect to the wire 1630 will move the closing ring 1214 along with the catheter 1530 and therefore open (FIG. 17A) and close (FIG. 17B) the jaws 1216, depending on whether the closing ring 1214 is in a position to cover and fold down the jaws 1216. For example, a trigger of the handle may be used to move the catheter 1630 forward (that is, advance towards a distal end) or backward (that is, retract the catheter toward the handle).

Accordingly, if the catheter 1530 is advanced distally in a direction shown by arrow 1710, the jaws 1216 will close or bend inward towards each other (as shown at FIG. 17B), and if the catheter 1530 is retracted proximally with respect to the wire 1630 in a direction shown by arrow 1720, the jaws 1216 will open or flex outward away from each other (particularly if the jaws 1216 are made from a material that retains its shape, such as a memory alloy) as shown at FIG. 17A. This is because the closing ring 1214 will apply pressure to the jaws 1216 which, in some examples, may be transmitted from the movement of the wire 1630 pushing or pulling the hub 1312. Thus, the opening and closing of the jaws 1216 may be performed by pushing or pulling on wire 1630 that is attached to hub 810 and/or moving the catheter 80 relative to the wire. Further, during this movement, where the jaws are opened and closed (either by movement of wire 1630 and/or by movement of catheter coupled to the closing ring), the jaws 1216 are not locked. That is, the tabs 1218 on jaws 1216 are not engaged with corresponding windows (e.g., 1220) on the closing ring 1214.

Further, when the catheter 1530 is engaged with the closing ring 1214 and the jaws are in any open configuration (the open configuration of jaws may be fully open as shown in FIG. 17A or partially open, for example), the catheter 1530 may be rotated (clockwise or anticlockwise), via a thumb wheel of a handle, for example to adjust an angular position of jaws 1216 with respect to the target tissue. In this way, an operator may quickly and effectively adjust positioning of the hemoclip, via linear and/or rotational motion of the catheter 1530, and/or the actuation wire 1630.

Figure 17C:
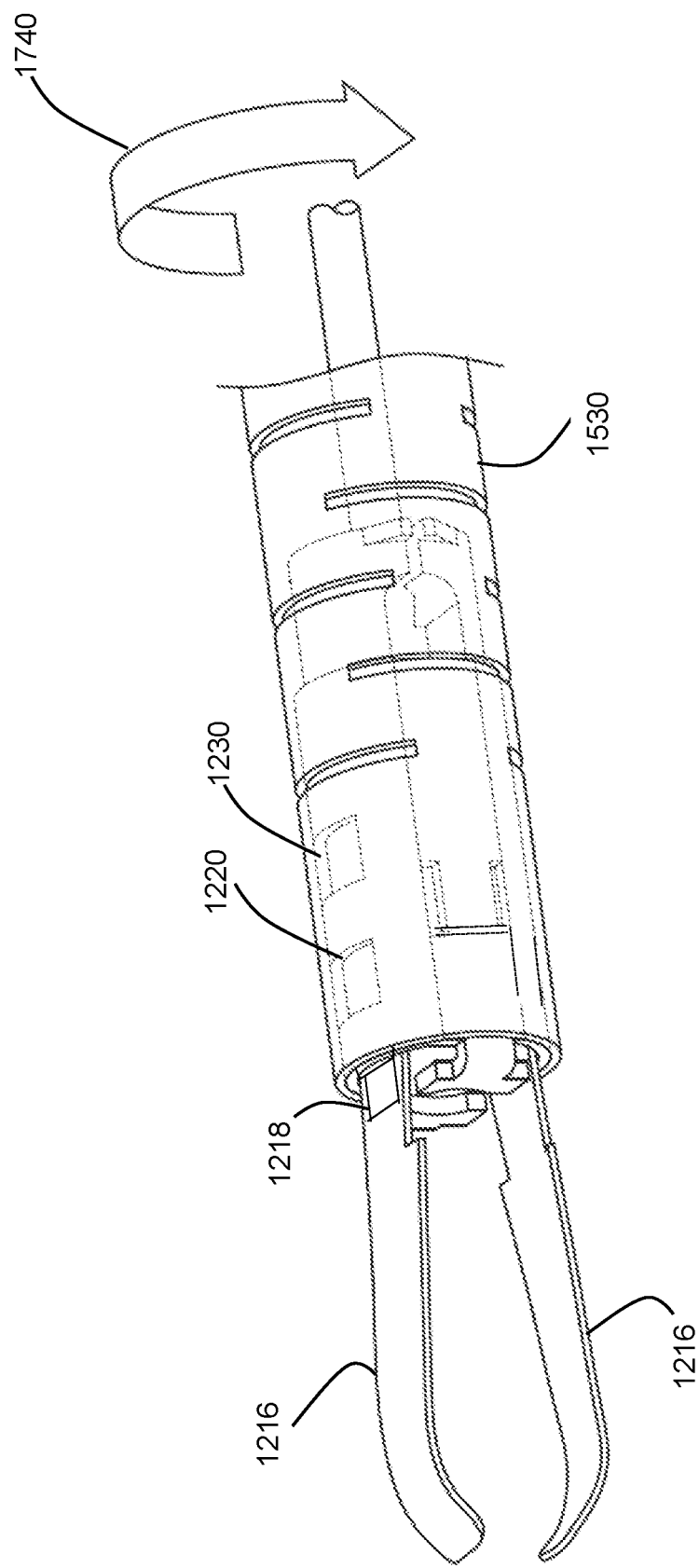
FIG. 17C illustrates an example of a perspective view of the hemoclip system of FIG. 16A inserted in the catheter and showing rotation of the catheter to withdraw the hemoclip system.
Figure 17D:
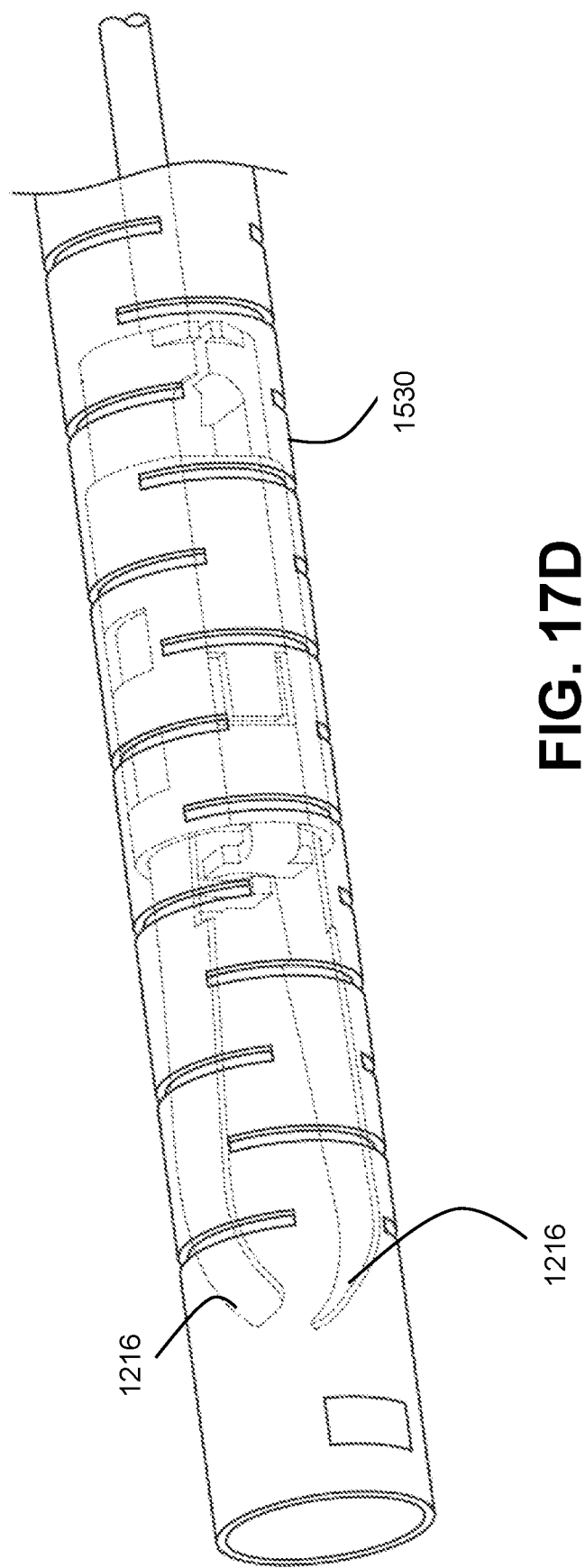
FIG. 17D illustrates an example of a perspective view of the hemoclip system of FIG. 16A inserted in the catheter and being retracted to close the jaws of the hemoclip.

FIGS. 17C and 17D illustrate an optional rotation and retraction operation respectively, wherein prior to locking of jaws 1216 with the closing ring 1214, the hemoclip 1216 may be retracted by first rotating the catheter 1530 ninety degrees or other suitable angle, as shown by block arrow 1740 (FIG. 17C) to disengage the closing ring 1214 from the catheter. Accordingly, the retention tab 1510 will now be angularly displaced from the interface window 1230, which allows the hemoclip (that is, the closing ring, the hub, and the jaws) to be retracted by pulling the wire 1630. In this way, even when a hemoclip is moved to the distal opening of the catheter, the user has the option of retracting the hemoclip by displacing the closing ring from the catheter prior to locking the jaws with the closing ring. Further, in this step, the hemoclip is retracted without locking the jaws with the closing ring. That is, the jaw locking tabs 1218 are not engaged with jaw locking windows 1220 on the closing ring.

Figure 17E:
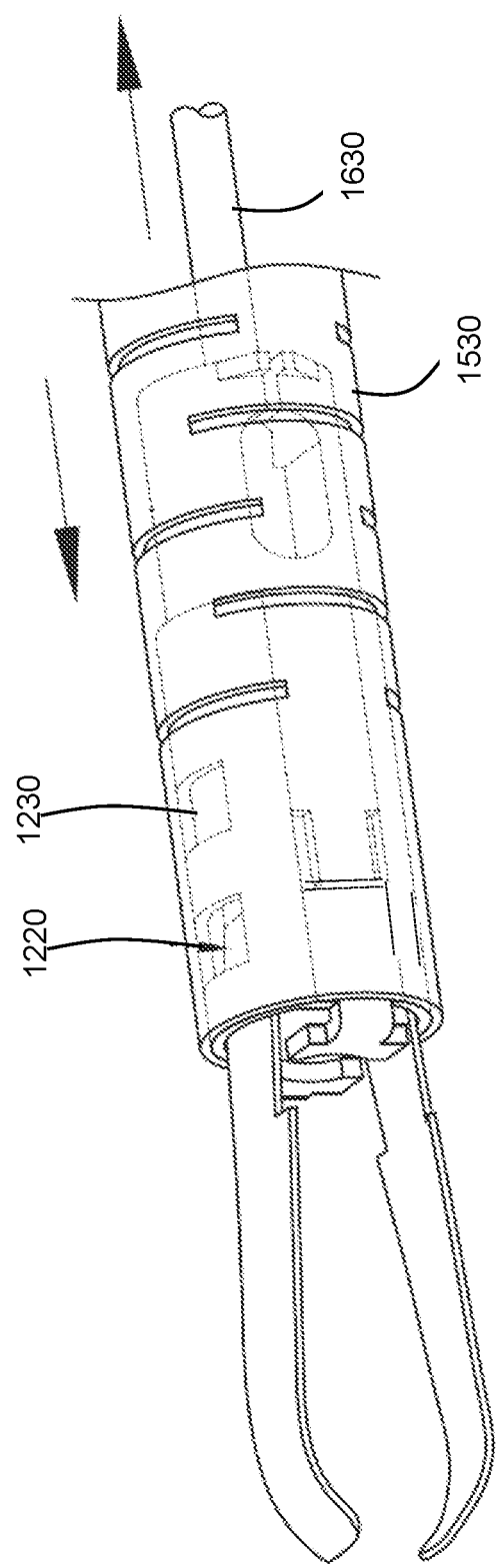
FIG. 17E illustrates an example of a perspective view of the hemoclip system of FIG. 16A inserted in the catheter and being retracted to deploy the hemoclip after locking the jaws closed on tissue using the ring.

FIG. 17E illustrates locking the locking tab 1218 of the jaws 1216 in the locking window 1220 by pushing/advancing the catheter 1530 far enough that the locking windows 1220 on the closing ring 1214 slide over and engage the locking tabs 1218 on the jaws 1216. Accordingly, in this configuration the jaws 1216 are closed or bent towards each other and engaged with patient tissue, for instance to close a wound or incision. In some examples, a combination of catheter movement and actuation wire movement (and in any sequence) may be employed to lock the hemoclip.

Figure 17F:
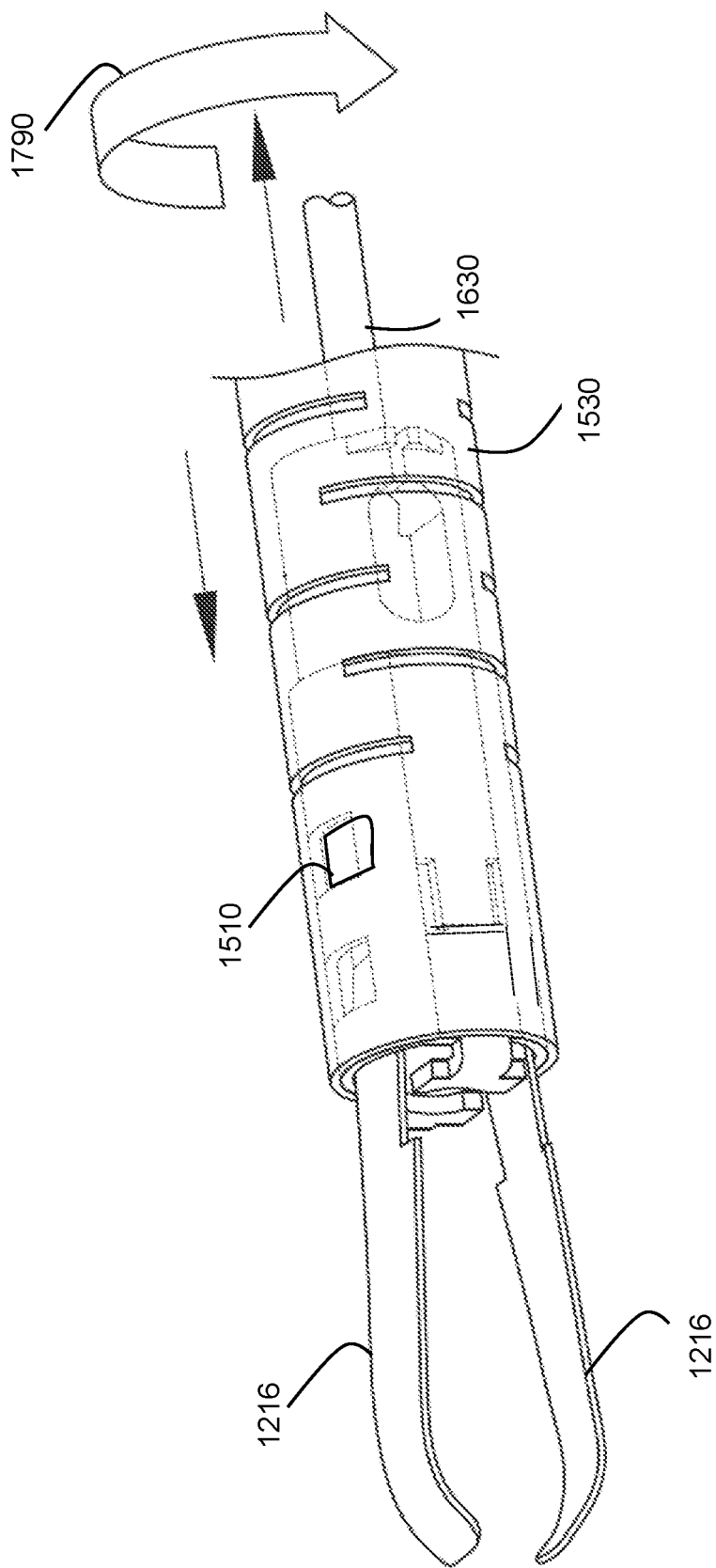
FIG. 17F illustrates an example of a perspective view of the hemoclip system of FIG. 16A inserted in the catheter and being rotated to deploy the hemoclip after locking the jaws closed on tissue using the ring.
Figure 17G:
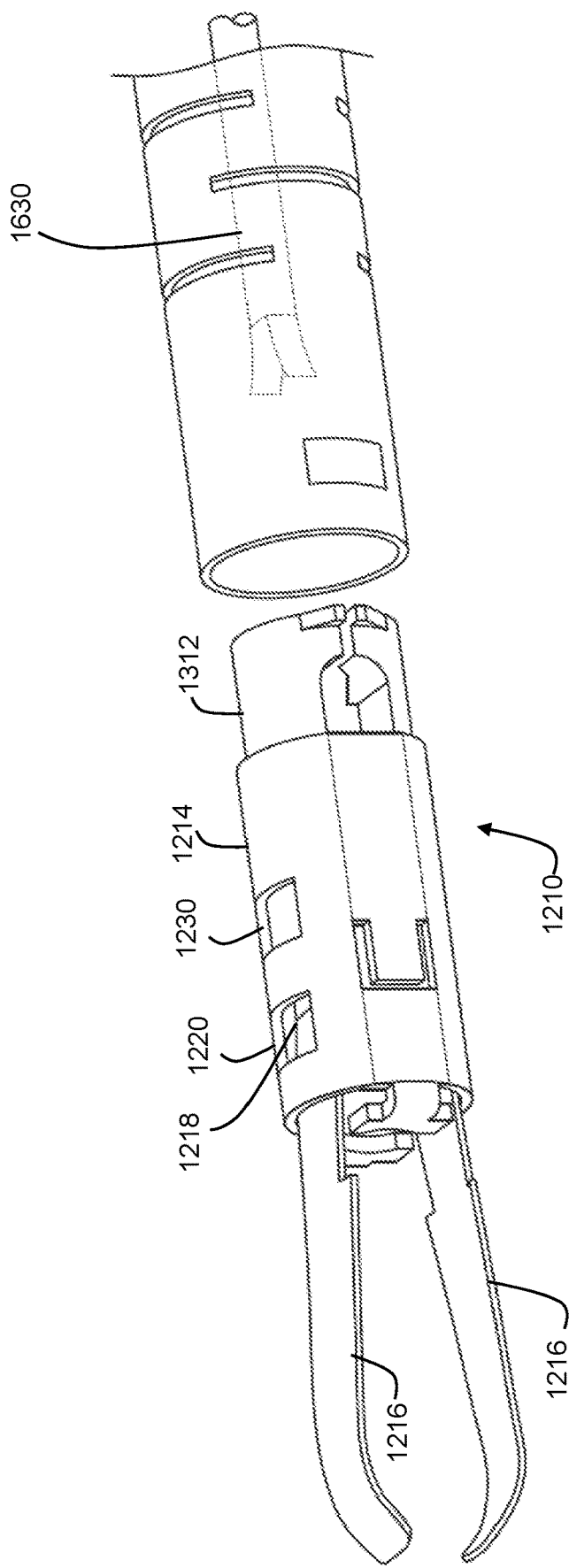
FIG. 17G illustrates an example of a perspective view of the hemoclip system of FIG. 16A released from the catheter.

FIGS. 17F and 17G illustrate releasing the hemoclip 1210 by moving one or more tabs 1510 (to disengage from catheter interfacing windows on the closing ring) by rotating the catheter 1530 ninety degrees further (indicated by block arrow 1790) or other suitable angles based on the arrangement of the interlocking mechanical features. In this way, after clasping the tissue, without moving the hemoclip, by using rotational motion of the catheter the hemoclip may be released. As a result, potential for tissue injury is greatly reduced. Upon disengaging, the catheter 1530 may be retracted, and further, the wire 1630 may be retracted to move out of the hub 1312. Accordingly, the hemoclip is now deployed.

In some examples, the next hemoclip may then be advanced down the catheter 1530 to the distal end to prepare it for deployment. Accordingly, the disclosed systems and methods allow an endoscope and/or associated catheter 1530 to load in multiple hemoclips 1210 to be deployed during surgery without having to reload the device. This is accordingly much more efficient and important during surgery where minimal time and tissue disruption are important.

Figure 18:
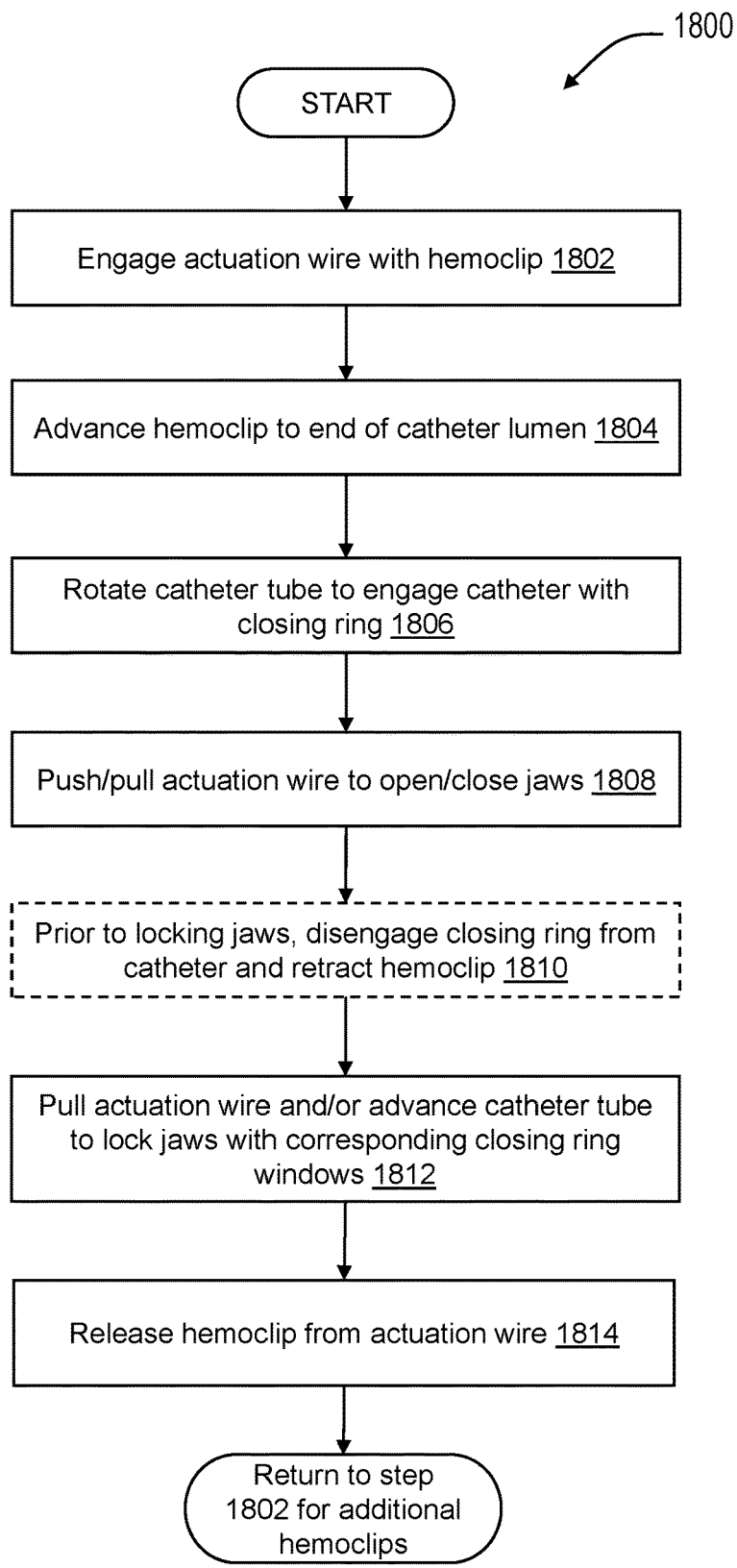
FIG. 18 shows a flow chart depicting a high-level method for deploying a hemoclip from a catheter in accordance with one or more embodiments of the present disclosure.

FIG. 18 shows a flow chart illustrating a high-level method 1800 for deploying a hemoclip, such as hemoclip 1210, via a catheter 1530. While the present method is described with respect to FIGS. 12-17F, it will be appreciated the method may be used in other similar systems without departing from the scope of the disclosure.

At 1802, the method 1800 includes engaging an actuation wire, such as actuation wire 1630, with a distal most hemoclip, such as hemoclip 1210, with a catheter, such as catheter 1530. Engaging the actuation wire may include connecting a distal portion of the actuation wire, the distal portion including a hub-connecting portion (e.g., a bulb, catch, etc.) with a hub of the hemoclip (e.g., hub 1312).

At 1804, upon engaging the actuation wire with the hub, the method 1800 includes advancing the hemoclip to a distal end of the catheter. In one example, a handle coupled to the catheter may include an actuation wire controller (e.g., a button). The actuation wire controller may be pushed to advance the actuation wire which in turn moves the engaged hemoclip to the distal open end of the catheter. Further, the hemoclip may be advanced until an advancement stop tab of the catheter meets a retention tab on the catheter. In this way, the advancement stop tab and the retention tab enables proper positioning of the hemoclip at the distal end.

At 1806, the method 1800 includes rotating the catheter and/or actuation wire, via the handle, to engage a closing ring (e.g., closing ring 1214) of the hemoclip with the catheter. For example, one or more catheter interfaces (e.g., windows 1230 and 1270) on the closing ring may engage with one or more retention tabs (e.g., tabs 1510) on the catheter to connect and engage the closing ring with the catheter. In one example, a thumbwheel of a handle (the thumbwheel controlling rotational movement of the catheter) may be used to rotate the catheter and/or a hemoclip loading button controlling movement of the actuation wire may be used to rotate the hemoclip to engage interfaces on the hemoclip with corresponding tabs on the catheter.

At 1808, the method includes advancing or retracting the actuation wire to open or close jaws. Additionally or alternatively, the actuation wire and/or catheter may be rotated to position the hemoclip with respect to the target. Accordingly, in some examples, optionally, prior to locking the jaws on the target tissue, the closing ring may be disengaged from the catheter (e.g., by rotating the catheter to displace the retention tabs from the catheter interface windows), and the entire hemoclip (that is, the closing ring, the hub, and the jaws) may be retracted, as show in FIG. 17D for instance.

Next, at 1812, upon positioning the hemoclip at a desired position with respect to the tissue, with the jaws in the open configuration, the method 1800 includes retracting the actuation wire and the hub so as to engage the closing ring with the jaw locking tabs (e.g., tabs 1218). In particular, jaw locking tabs may engage with the jaw interfacing windows (e.g., 1220 and 1270) on the closing windows, which causes the jaws to close around the target tissue. In some examples, the handle may include a trigger, which allows the actuation wire engaged with the hub to be pulled back for locking the jaw with the closing ring. In some examples, additionally, when a mechanical limit is reached for retraction of the wire, the catheter may be advanced to facilitate locking of the jaws with the closing ring. Alternatively, in some examples, the trigger action may move catheter forward via gears until mechanical limit and then move the actuation wire back.

Finally, at 1814, the method includes releasing the hemoclip from the actuation wire after the jaws are locked with the target tissue. This includes rotating the catheter to disengage the closing ring from the catheter (that is, disengaging the retention tab of the catheter from the catheter interface window of the closing ring). In particular, the catheter is rotated without rotating the hemoclip. Further, upon disengaging the closing ring from the catheter, the method includes retracting the actuation wire to finally disengage the actuation wire from the hub (e.g., the actuation wire may be pulled out of flexible tabs).

Upon deploying one hemoclip, the method 1800 may return to 1802 if deployment of one or more additional hemoclips are desired.

Hemoclip Materials and Fabrication

In one example, the hubs (e.g., hub 1312) and the closing rings (e.g., closing rings 1214) may be 3D printed from plastic or other suitable materials.

In another examples, the ring may be fabricated by a laser cutting process. In this example, the ring may be laser cut and bent to certain proportions.

Further, in one example, the pair of jaws (e.g., jaws 1216) may be laser cut and bent into shapes disclosed herein. As a non-limiting example, the jaws may be formed by laser cutting a thin sheet of nitinol followed by heat setting to shape. In some examples the various elements of the hemoclip (e.g., ring, hub, jaw) may be made from spring tempered steel, or other suitable metals or materials.

Example 3: Hemoclip and Deploying Endoscope

Figure 19:
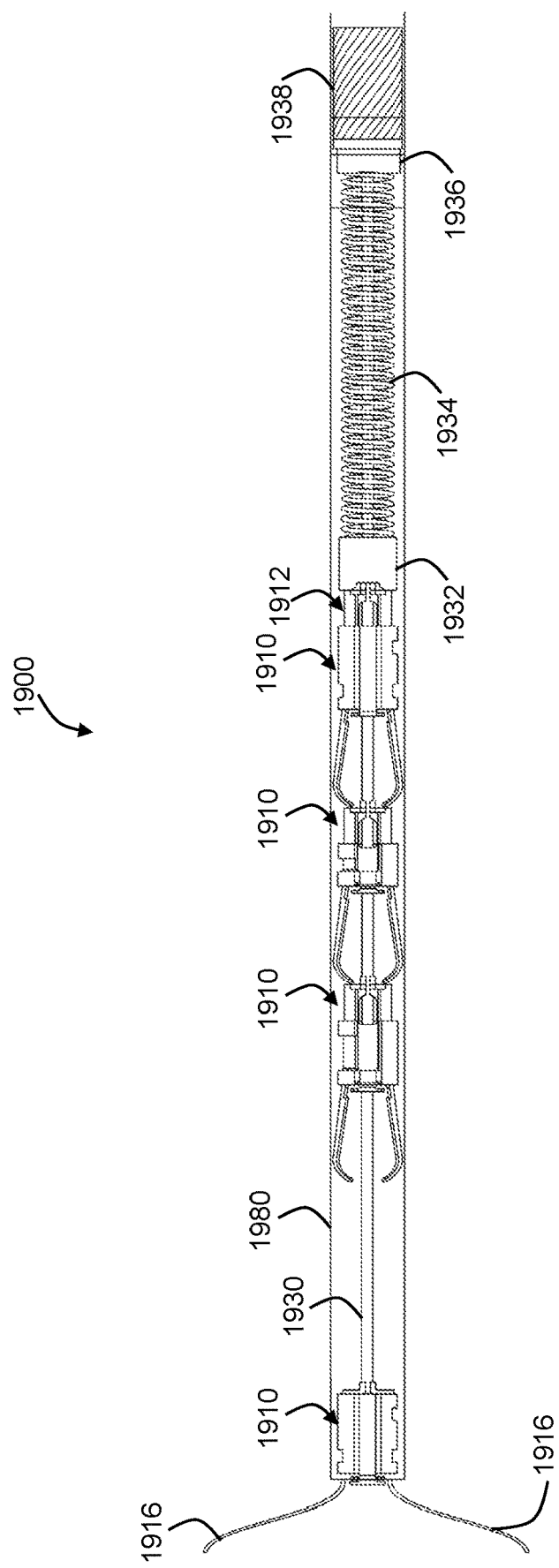
FIG. 19 illustrates a side view of example of an endoscope system comprising a plurality of hemoclip systems in accordance with one or more embodiments of the present disclosure.

FIG. 19 illustrates an endoscope system 1900 including a catheter 1980 that is a part of an endoscope and comprising a plurality of hemoclips 1910 arranged serially along an actuation wire 1930 inside the catheter 1980. Each hemoclip 1910 may be similar to hemoclip 1210 discussed above. The endoscope system includes a spring cap 1932 for a spring 1934 that engages or fits onto the back of a hub 1912 of a proximal most hemoclip 1910 arranged in the catheter 1980. Additionally, the spring 1934 is connected to a coupler/spring retainer 1936 that is connected to a hollow torque tube 1938, which may be a part of a handle that is used to perform one or more actions required to position and deploy one or more hemoclips in succession. Details of the handle are described below at FIGS. 22-26.

Figure 20:
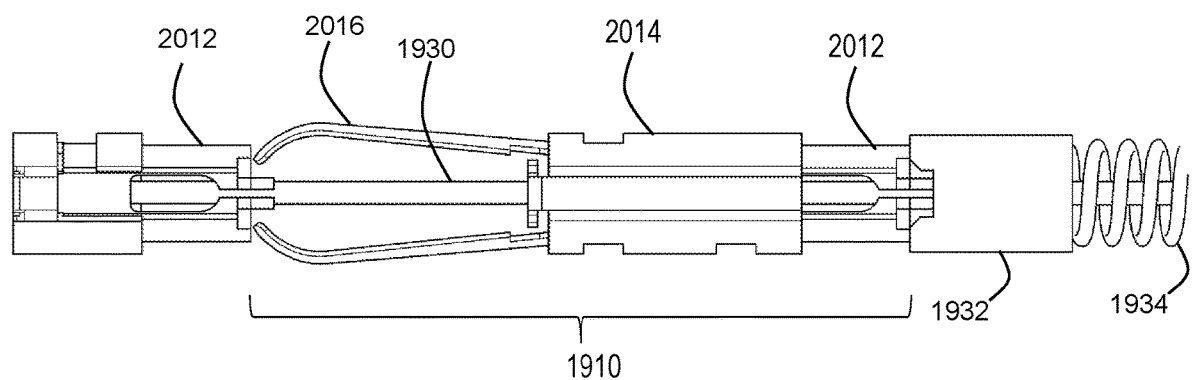
FIG. 20 illustrates a hemoclip system coupled to a proximal end of a catheter of an endoscope system in accordance with one or more embodiments of the present disclosure.

FIG. 20 shows the proximal most hemoclip 1910 interfacing with the hub 2012 of a next hemoclip. In particular, the jaws 2016 of the proximal hemoclip 1910 is shown interfacing with the hub 2012 of the next hemoclip. The interfacing of the hemoclips 1910 with each other, in some examples, keeps them aligned because one of the hemoclips (for instance at this most distal end, is aligned in the catheter with the retention tab. As indicated above, each hemoclip may be similar to hemoclip 1210 discussed above. Accordingly, the hub 2012, the closing ring 2014 and the jaws 2016 may be similar to the hub 1312, the closing ring 1214, and the jaws 1216 respectively.

In another example, the jaws 2016 of one hemoclip may not interface with another hemoclip. For example, the plurality of hemoclips may be stacked back to back along a length of the actuation wire 1930 without interfacing or touching each other. As a non-limiting example, the curved tips of the jaws may face the wire 1930 but not touch the wire in order to allow sufficient opening for the actuation wire 1930 to be pushed and pulled while deploying other hemoclips.

Figure 21A:
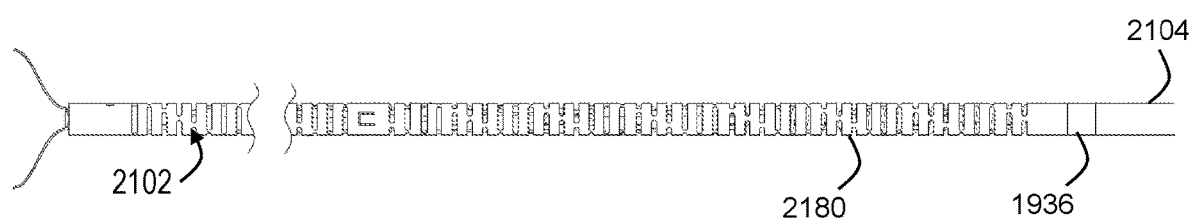
FIG. 21A illustrates an example catheter housing one or more hemoclip systems in accordance with one or more embodiments of the present disclosure.
Figure 21B:
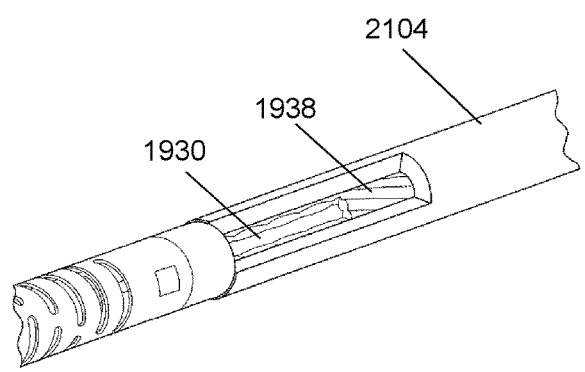
FIG. 21B illustrates example internal features of an outer sheath that coupled the catheter of FIG. 21A with a handle in accordance with one or more embodiments of the present disclosure.

FIG. 21A illustrates another example of a catheter 2180 according to one embodiment. In this example, the catheter 2180 may include a staggered laser cut pattern that is flexible and also transmits torque to allow the operator to rotate (e.g., to engage and disengage the retention tabs) the catheter 2180 during deployment of a hemoclip. Additionally, the catheter 2180 may include an outer sheath 2104 enclosing the torque tube 1938, and the actuation wire 1930 as illustrated in FIG. 21B.

Example 4: Handle

Figure 22:
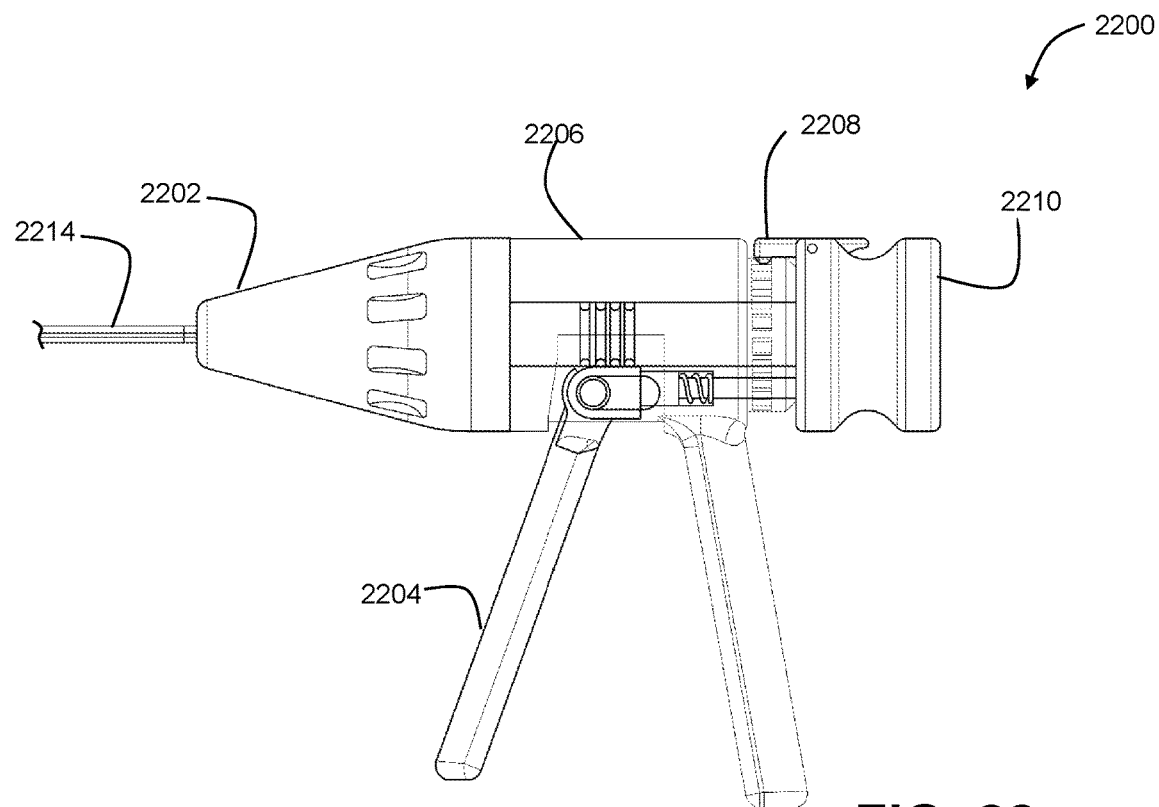
FIG. 22 illustrates a side view of an example of a handle for controlling deployment of a hemoclip in accordance with one or more embodiments of the present disclosure.
Figure 23:
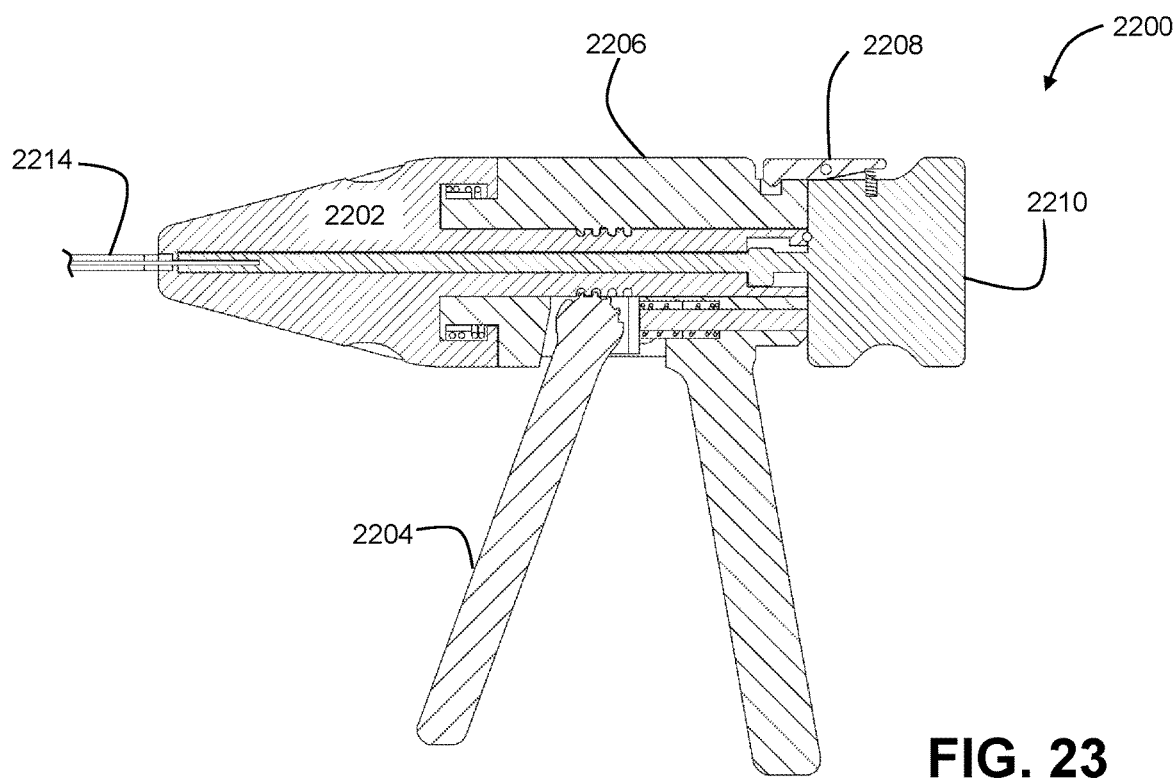
FIG. 23 illustrates a cross section of the handle of FIG. 22.

FIGS. 22 and 23 illustrate a side view and a cross-sectional view of an example of a handle 2200 for an operator to use to deploy hemoclips, such as hemoclips 1210, using the disclosed systems and methods. The handle 2200 includes a main body 2206 connected to a catheter control 2202 and an actuation wire control 2210. A catheter 2214, which may be an example of catheter 1580, or 2180 or any of the catheters described herein, is attached to the handle 2200. In particular, the catheter 2214 is coupled to the catheter control 2202 for adjusting a degree of rotation of the catheter and an actuation wire control 2210 to retract and advance an actuation wire, such as wire 1630, wire 1930, or other actuation wires as disclosed herein. Additionally, the handle 2200 may provide the force necessary, via a trigger 2204, to open/close and/or lock the jaws (e.g., jaws 1216) on the hemoclip in order to deploy the hemoclip. For example, the trigger 2204 may advance or retract the catheter 2214 to close or open jaws of the hemoclip.

Figure 24:
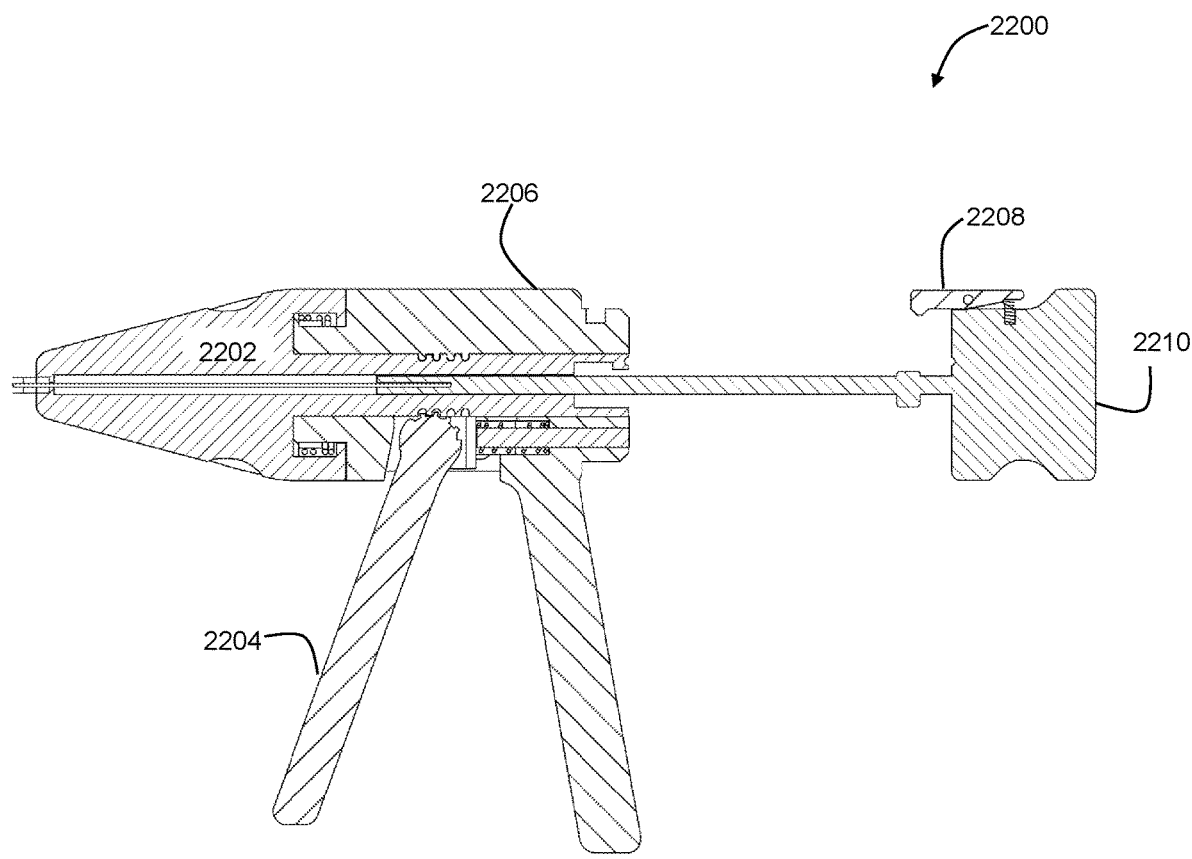
FIG. 24 illustrates another cross section of the handle of FIG. 22 and showing the handle with an actuation wire control portion pulled away from a main body.

FIG. 24 illustrates an example unlatched and pulled position of the handle 2200 during a process for deploying hemoclips using the handle 2200. For instance, holding the handle 2500, the operator may unlatch the actuation wire control 2210 (for example, by releasing a latch 2208) and pull away the actuation wire control 2210 to retrieve a new hemoclip. The actuation wire control 2210 maybe rotated to retrieve the hemoclip in some examples. Further, in some examples, a first hemoclip deployed may be preloaded and engaged with the actuation wire.

Next, the actuation wire control 2210 maybe pushed back (towards the handle 2200) and locked with the catheter control 2202 of the handle 2200. However, the actuation wire control 2210 may not be pushed all the way to latching, in this step. In this position, the operator may see the hemoclip jaws in the boroscope. Accordingly, the operator may rotate the actuation wire and sleeve/catheter as one unit until they can see the hemoclip.

Further, the operator can then push in the actuation wire control part until it clips into the main body 2206. This locks the actuation wire control with the main body and decouples the catheter control part. In one example, ball detents may allow for 0, 90, 180, and 360 degree stops.

Then, the catheter control 2202 can be rotated 90 degrees to engage the hemoclip. Pulling and releasing the trigger halfway advances and retracts the catheter tube 2214 and closing ring, for opening and closing the jaws of the hemoclip, for example.

The trigger may be pulled further to lock the jaws with the closing ring and clip the hemoclip to the target tissue. Once clipped, the catheter control on the handle 2200 may then be rotated ninety degrees until the ball dent is contacted. In that instance, the catheter 2214 will rotate, while the actuation wire would stay in the same position.

Lastly, the trigger may be pulled the rest of the way to uncouple the actuation wire and/or a catch of the wire from the hub of the hemoclip, and retract the wire. Then, a new hemoclip may be loaded.

Example 5: Handle

Figure 25:
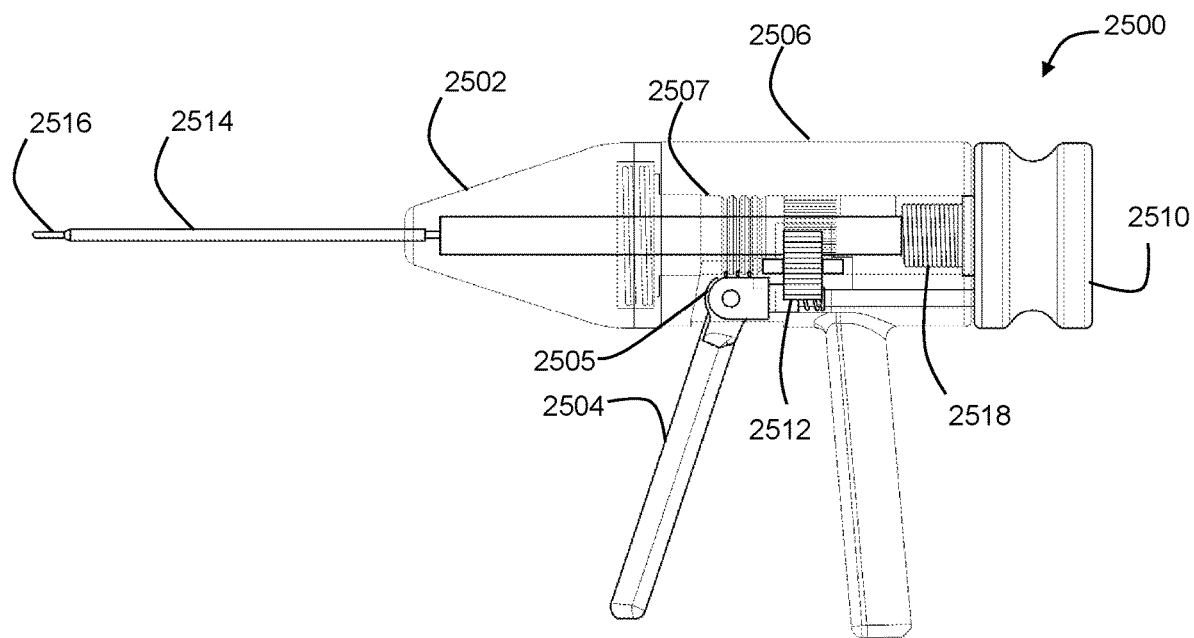
FIG. 25 illustrates a side view of another example of a handle for controlling deployment of a hemoclip in accordance with one or more embodiments of the present disclosure.

FIG. 25 illustrates another embodiment of a handle 2500 according to one or more embodiments of the present disclosure. The handle 2500 includes a hemoclip loading button 2510 that may be pulled back to engage an actuation wire (e.g., actuation wire 1130, 1630, or any actuation wire described herein) with a new hemoclip (e.g., hemoclip 1210, 1910, etc.). In particular, a catch (e.g., catch 1120) of the actuation wire may contact and engage with a hub of the hemoclip when the hemoclip loading button is operated for hemoclip engagement (that is, pulled back). Upon engagement of the actuation wire with the hemoclip, the loading button may be then pushed forward to extend the hemoclip to outside a catheter 2514. The hemoclip outside the catheter is indicated at 2516. Catheter 2514 may be similar to catheter 780, 1530, 1980, or any catheter described herein and including one or more hemoclips arranged within the catheter. Thus, by pushing the hemoclip loading button 2510, the hemoclip 2516 is advanced to the distal end of a lumen of the catheter. Additionally, the loading button 2510 may be used to rotate the hemoclip 2516 once loaded to an orientation suitable for the operator to position the hemoclip 2510 with respect to a target tissue of a subject.

The handle 2500 further includes a thumbwheel 2512 (alternatively referred to herein as rotation wheel), which may be utilized to rotate the catheter 2514 so as to align one or more retention tabs (e.g., retention tabs 1510) of the catheter with corresponding catheter interfacing windows (e.g., windows 1230 and 1270 on closing ring 1214) on a closing ring of the hemoclip and lock the catheter with the closing ring. Further, once the catheter is engaged with the hemoclip, via the closing ring, the hemoclip and the catheter may be rotated together via the thumbwheel to adjust an angular position of the hemoclip 2516 with respect to the target tissue. Through the thumbwheel, varying degree of angular adjustments may be made (e.g., between 0 to 360 degrees). This includes fine angular adjustment to fine tune clip positioning as well as larger angular adjustments. In this way, via the thumbwheel 2512, the hemoclip 2516 is rotated with respect to the target tissue, which facilitates hemoclip positioning.

The handle 2500 includes a trigger 2504. The trigger may be squeezed until a resistance is felt by the operator in order to open and close the jaws of the hemoclip without locking the jaws. The trigger mechanism moves an outer shell of the handle 2500 that is connected to the catheter 2514 and thus advances the catheter forward and backward. For example, the trigger may include a curved portion 2505 with teeth (e.g., a semicircular gear) that may move a linear shaft 2507 with corresponding groves which moves the outer shell of the handle 2500 connected to the catheter 2514.

When the catheter 2514 is retracted, the hemoclip jaws open because the catheter is no longer restraining their bias towards opening. When the catheter 2514 is advanced via the trigger, the jaws of the hemoclip close. Similarly, when the closing ring is locked with the catheter, the catheter and the closing ring advance distally to close the jaws by actuation of the trigger 2504 or retract to open the jaws via the trigger 2504.

Further, the trigger 2504 may be used to lock the jaws of the hemoclip on to the target tissue. For example, the trigger 2504 may be fully squeezed to latch the jaws of the hemoclip on a tissue as disclosed herein. In particular, fully actuating the trigger 2504 may move the catheter forward until a mechanical limit and the, retracts the actuation wire back relative to catheter tube to lockjaws. As discussed above, the jaws are locked when the locking tabs (e.g., tabs 1218) on jaws engage corresponding windows (e.g., 1220 and 1270) on lock ring. Upon locking the jaws, the hemoclip is released from the catheter. For example, through internal action of the handle, the catheter may be rotated to disengage the catheter from the catheter interface window. The actuation wire can then slip out of the hub, thereby releasing the hemoclip from the catheter.

Figure 26:
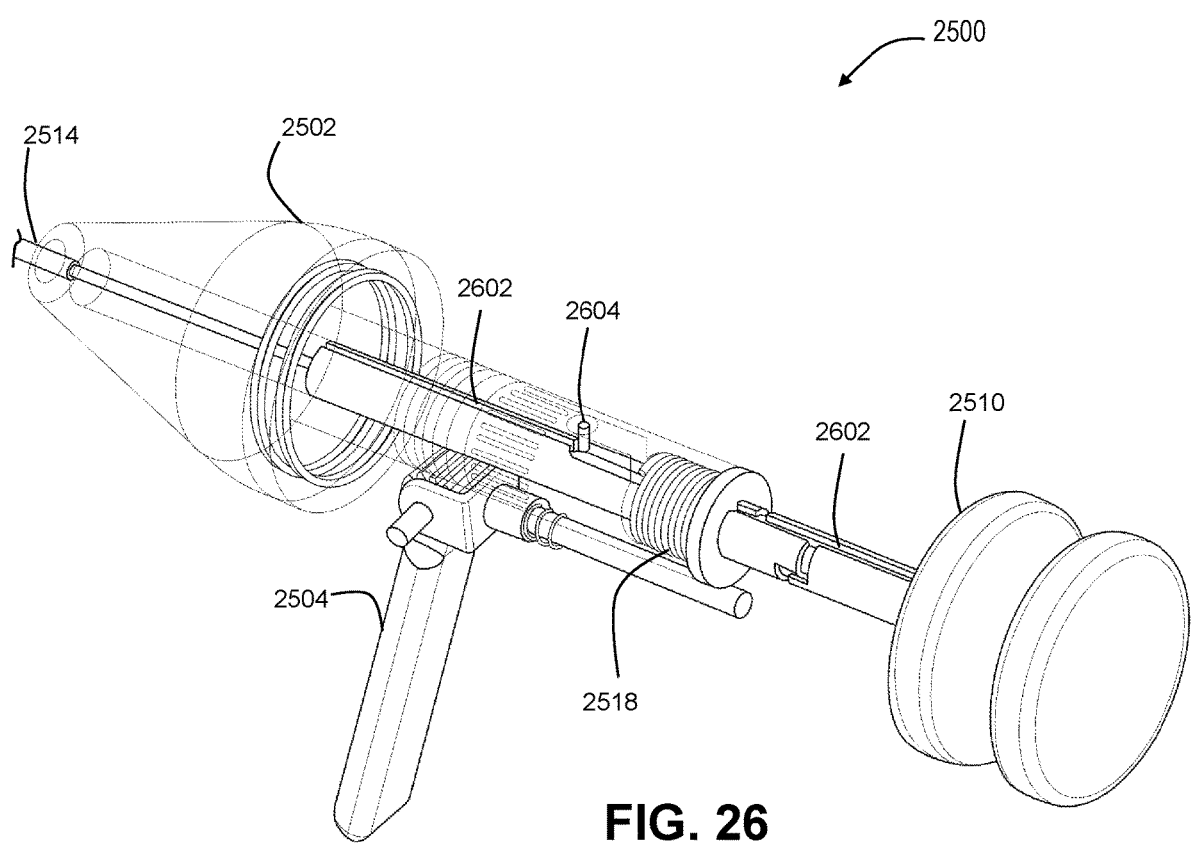
FIG. 26 illustrates a perspective view of a portion of the handle of FIG. 25.

FIG. 26 illustrates further detail of the handle 2500 and the gears. In particular, FIG. 26 shows an example in which the catheter control and actuation wire control are constrained via channels 2602 in the actuation wire control coupled with a pin 2604 in the catheter control. The channels restrict and guide the movement of the components during operation of the handle. Also illustrated is a clock spring 2518 that keeps the rotation torsion constant between the two parts. When rotation is necessary, the spring automatically performs the action, limited and constrained by the channels 2602 in the actuation wire control/loading button.

In this way, the handle may be used to allow a surgeon to single handedly and intuitively perform most or all the actions needed to successfully position and deploy multiple hemoclips in succession. Via the handle, the surgeon may employ linear motion, rotational motion, and opening and closing of the hemoclip in order to prepare the wound for closing.

Figure 27:
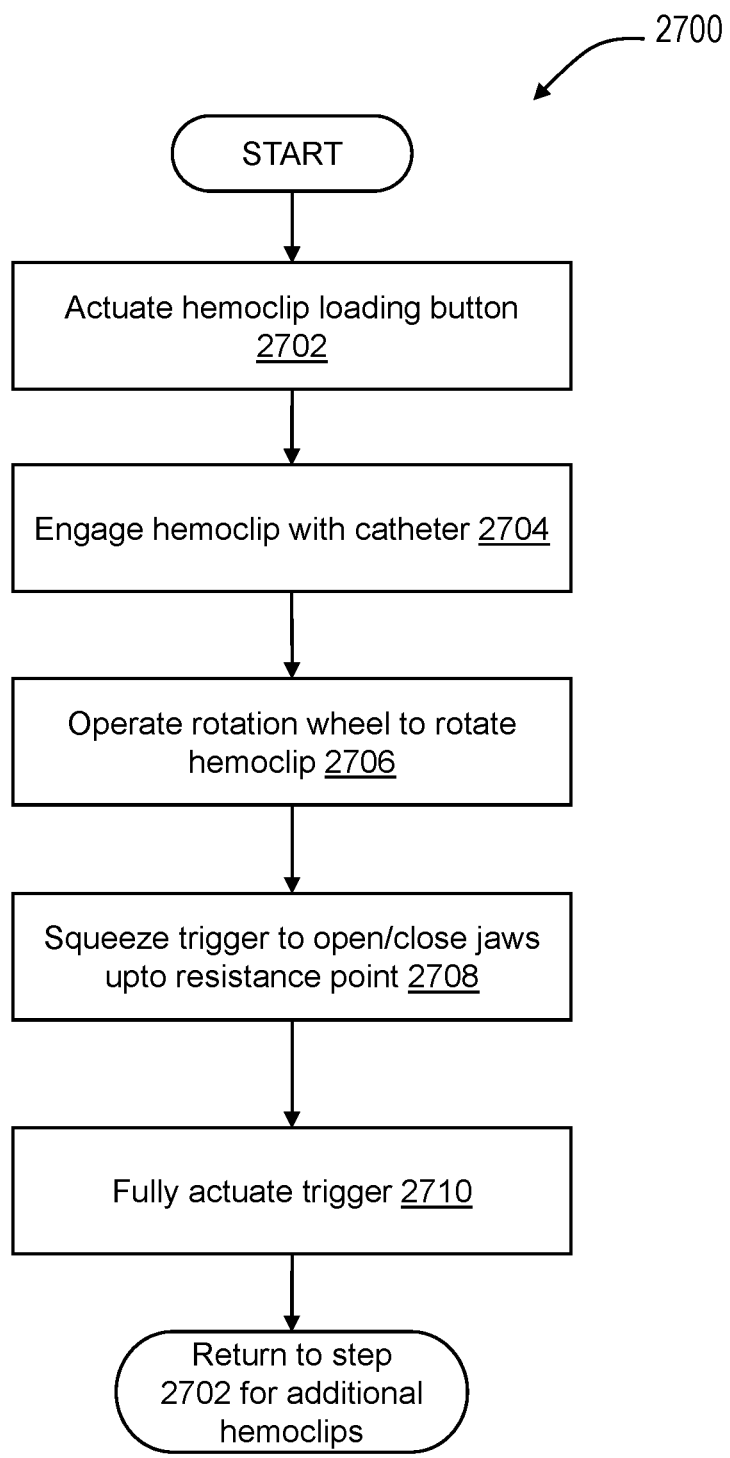
FIG. 27 is a flow chart depicting a high-level method for operating a handle for deploying a hemoclip in accordance with one or more embodiments of the present disclosure.

FIG. 27 shows a flowchart illustrating a high-level method 2700 for operating a handle, such as handle 2500 discussed above at FIGS. 25 and 26. The handle 2500 may be operated by an operator, such as a clinician, or a physician or an assistant. The method 2700 includes, at 2702, actuating a hemoclip loading button, such as button 2510, to engage and advance a hemoclip to a distal end of a catheter. This may include, in one example, drawing the hemoclip loading button back to pull an actuation wire from a distal portion (e.g., after deploying one hemoclip) towards the hemoclip in the catheter that is to be used for deployment (e.g., a next outermost hemoclip for deployment) and coupling the actuation wire with the hemoclip. For instance, a catch at a distal end of the actuation wire may be used for coupling. Upon coupling, the actuation wire may be advanced, for example by pushing the hemoclip loading button.

Next, at 2704, the method 2700 includes engaging the hemoclip with the catheter. Engaging the hemoclip with the catheter includes rotating the hemoclip via the actuation wire and/or rotating the catheter to connect one or more interfaces on the hemoclip with corresponding retention tabs on the catheter. In one example, engagement of the hemoclip with the catheter may be performed automatically when the hemoclip loading button is pushed to advance the hemoclip to the opening end of the catheter. Thus, pushing the hemoclip loading button and releasing may advance the hemoclip to the opening of the catheter (e.g., until advancement stop tab 1240 on the hemoclip meets retention tab 1510 on the catheter) and rotate the catheter and/or the actuation wire to connect one or more interfaces (e.g., catheter interfacing window 1230 and window 1270 in the example at FIG. 12) on a closing ring hemoclip with corresponding retention tabs (e.g. tab 1510) on the catheter.

Next, at 2706, the method 2700 includes operating a rotation wheel (also e.g., thumbwheel 2512) of the handle such as wheel 2512 to rotate the catheter. As the hemoclip is engaged with the catheter, turning the rotation wheel allows rotation of the hemoclip with respect to the tissue (that is, the hemoclip does not rotate with respect to the catheter but rotates with respect to the target tissue). In this way, rotation of the hemoclip, via the rotation wheel, allows the operator to position the hemoclip with respect to the target tissue before deployment.

Next, at 2708, the method 2700 includes actuating a trigger partially (e.g., trigger 2504) to open and close jaws of the hemoclip. For example, the trigger may be squeezed up to a resistance threshold to open and close the jaw without locking the jaw. Squeezing the trigger may cause the catheter (and the connected closing ring) to advance. As an example, the trigger may move a linear shaft of the handle coupled to the catheter, and thus, squeezing the trigger may advance the catheter and releasing the trigger may retract the catheter. When the catheter is coupled to the closing ring, squeezing the trigger (within the resistance threshold) advances the catheter and connected the closing ring linearly over the jaws causing the jaws to close without locking the jaws. Further, releasing the trigger retracts the catheter and the connected closing ring linearly in the opposite direction causing the jaws to open.

Next, at 2710, the method 2700 includes squeezing the trigger fully to lock the jaws on to the closing ring. For example, the trigger may be squeezed fully to lock the jaws and simultaneously release the actuation wire. Upon locking the jaws, the actuation wire may be pulled out to complete deployment of the hemoclip. Steps 2706 and 2708 may be repeated and in any sequence. Further, the method 2700 may return to step 2702 to load and deploy additional hemoclips.

In this way, multiple hemoclips may be housed within a single device. Further, the operation of the hemoclip system, including operation of the handle and adjustment of position of the hemoclip via the various interfaces on the catheter as well as the closing ring and the jaws, allows the procedure to be performed quickly and efficiently, thereby shortens an overall procedure time, which in turn reduces costs for cases which require multiple hemoclips. Further, the hemoclip systems and methods described herein enables for single handed operation if desired which places more control in the hands of the operator while enabling proper positioning, improving efficiency of deployment, and maintaining tissue integrity.

In one embodiment, a hemoclip assembly comprises one or more hemoclips arranged within a catheter, the catheter including at least one tab; and an actuation wire including a distal catch end for releasably engaging with one of the one or more hemoclips; wherein each of the one or more hemoclips comprises one or more interfaces configured to releasably connect with the catheter via the at least one tab. In one example of the hemoclip assembly, each of the one or more hemoclips include a closing ring, the closing ring comprising a body comprising at least one catheter interface and at least one jaw locking interface; wherein the at least one catheter interface is configured to engage with the catheter, and wherein the at least one jaw locking interface is configured to engage with at least one jaw of two or more jaws of each hemoclip. Further, the closing ring is configured to fit over a hub supporting the two or more jaws of the hemoclip and also fit within the catheter. The hemoclip assembly further comprises a handle, the handle including a trigger for controlling linear movement of one or more of the catheter and the actuation wire. In one example of the hemoclip, the handle further includes a hemoclip loading button for controlling engagement and movement of hemoclips with the actuation wire (within the catheter) during deployment and rotation of the hemoclips. The handle further includes a thumb wheel for rotating the catheter.

Selected Embodiments

Although the above description and the attached claims disclose a number of embodiments of the present invention, other alternative aspects of the invention are disclosed in the following further embodiments.

Embodiment 1. A closing ring for a hemoclip, the closing ring comprising: a body comprising at least one catheter interface and at least one jaw locking interface; wherein the at least one catheter interface is configured to engage with a catheter, the catheter housing the closing ring; and wherein the at least one jaw locking interface is configured to engage with at least one jaw of two or more jaws of the hemoclip.

Embodiment 2. The closing ring of embodiment 1, further comprising one or more tissue guards at a distal end, the one or more tissue guards having a central opening to allow an actuation wire to pass through.

Embodiment 3. The closing ring of embodiment 1 and/or 2, further comprising a common interface on the body, the common interface configured to engage with the catheter or any of the two or more jaws of the hemoclip.

Embodiment 4. The closing ring of one or more of embodiments 1 through 3, wherein the body includes a flat portion, the flat portion including an attachment stop tab; and wherein the flat portion is configured to allow the body to move past a retention tab on the catheter while the attachment stop tab is configured to contact the catheter and stop movement of the body beyond the retention tab.

Embodiment 5. The closing ring of one or more of embodiments 1 through 4, wherein one or more of the at least one catheter interface, the at least one jaw interface, and the common interface are openings on the body.

Embodiment 6. The closing ring of one or more of embodiments 1 through 5, wherein the one or more of the at least one catheter interface, the at least one jaw interface, and the common interface are openings having a geometric shape.

Embodiment 7. The closing ring of one or more of embodiments 1 through 6, wherein the body is hollow and configured to fit over a hub supporting the two or more jaws of the hemoclip and within the catheter.

Embodiment 8. The closing ring of one or more of embodiments 1 through 7, wherein the closing ring is configured to be advanced over the two or more jaws to hold the two or more jaws closed.

Embodiment 9. A hemoclip system, the system comprising: a hemoclip comprising a first and second jaw; a hub configured to connect to the hemoclip; and a closing ring configured to fit over the hub.

Embodiment 10. The system of embodiment 9, further comprising an actuation wire routed through a channel in the hub.

Embodiment 11. The system of embodiment 9 and/or 10, wherein each of the first and second jaw comprise a locking tab.

Embodiment 12. The system of one or more of embodiments 9 through 11, wherein the first and second jaw are attached to a joint.

Embodiment 13. The system of one or more of embodiments 9 through 12, wherein the closing ring is configured to be advanced over the first and second jaws to hold the first and second jaws closed.

Embodiment 14. The system of one or more of embodiments 9 through 13, wherein the closing ring comprises at least one jaw locking interface configured to engage with the locking tab.

Embodiment 15. The system of one or more of embodiments 9 through 140, wherein the hub is configured to connect to the hemoclip at the joint.

Embodiment 16. The system of one or more of embodiments 9 through 15, wherein the hub comprises flexible tabs that are configured to releasably attached to a catch attached to the wire.

Embodiment 17. The system of one or more of embodiments 9 through 16, further comprising a catheter comprising a tunnel configured to fit the hemoclip.

Embodiment 18. The system of one or more of embodiments 9 through 17, further comprising an endoscope comprising the catheter.

Embodiment 19. The system of one or more of embodiments 9 through 180, wherein the catheter comprises one or more retention tabs configured to engage with one or more catheter interfaces of the closing ring.

Embodiment 20. The system of one or more of embodiments 9 through 19, further comprising a handle connected to the catheter, the handle comprising: a thumbwheel; a trigger; a main body; and an actuation wire control connected to a latch.

Embodiment 21. The system of one or more of embodiments 9 through 20, wherein the trigger is connected to a gear system, the gear system is connected to a shell, and the shell is connected to the catheter.

Embodiment 22. The system of one or more of embodiments 9 through 21, wherein the trigger is configured to advance the shell to advance the catheter when partially depressed.

Embodiment 23. The system of one or more of embodiments 9 through 22, wherein the catheter comprises a staggered laser cut pattern.

Embodiment 24. The system of one or more of embodiments 9 through 23, wherein the catheter comprises an outer sheath, a torque tube and an actuation wire.

Embodiment 25. A method of deploying a hemoclip, the method comprising: inserting a hemoclip attached to a hub with a closing ring attached to the hub inside a catheter; advancing a wire connected to the hub to advance the hemoclip to an end of the catheter; rotating the catheter to engage the catheter with the closing ring; advance the locking ring engaged with the catheter to lock a pair of jaws of the hemoclip; rotate the catheter to disengage the catheter form the closing ring; and retract the wire to disconnect the hub from the wire.

Embodiment 26. The method of embodiment 25, wherein engaging the catheter with the closing ring comprises rotating the catheter so that a retention tab protrudes through an interface window of the closing ring.

Embodiment 27. The method of embodiment 25 and/or 26, wherein advancing the wire to the hub to advance the hemoclip to the end of the catheter comprises advancing the wire until an advancement stop on the closing ring contacts the retention tab on the catheter.

Embodiment 28. The method of one or more of embodiments 25 through 27, wherein retracting the wire to disconnect the hub from the wire comprises pulling a catch connected to the wire out of one or more flexible tabs of the hub.

Embodiment 29. The method of one or more of embodiments 25 through 28, wherein the closing ring comprises a locking window; and wherein advance the closing ring to lock a pair of jaws of the hemoclip, further comprises engaging a locking tab on at least one of the pair of jaws with the locking window.

Embodiment 30. The method of one or more of embodiments 25 through 29, further comprising, prior to locking the pair of jaws disengaging the catheter from the closing ring and retracting the hemoclip along with the closing ring.

CONCLUSION

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the disclosure has been disclosed in the context of certain embodiments and examples, it will be understood by those skilled in the art that the embodiments of the disclosure extend beyond the specifically disclosed embodiments to other alternative embodiments and/or uses and modifications and equivalents thereof.

In some embodiments, the terms "a" and "an" and "the" and similar references used in the context of describing a particular embodiment of the disclosure (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Certain embodiments of this disclosure are described herein. Variations on those embodiments will become apparent to those of ordinary skill in the art upon reading the foregoing description. It is contemplated that skilled artisans can employ such variations as appropriate, and the disclosure can be practiced otherwise than specifically described herein. Accordingly, many embodiments of this disclosure include all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the disclosure disclosed herein are illustrative of the principles of the embodiments of the disclosure. Other modifications that can be employed can be within the scope of the disclosure. Thus, by way of example, but not of limitation, alternative configurations of the embodiments of the disclosure can be utilized in accordance with the teachings herein. Accordingly, embodiments of the present disclosure are not limited to that precisely as shown and described.

The invention claimed is:

1. A closing ring for a hemoclip, the closing ring comprising:
  a body comprising a flat portion, at least one catheter interface and at least one jaw locking interface,
  wherein the flat portion including an advancement stop tab is configured to allow the body to move past a retention tab on a catheter while the advancement stop tab is configured to contact the catheter and stop movement of the body beyond the retention tab;
  wherein the at least one catheter interface is configured to engage with the catheter housing the closing ring; and
  wherein the at least one jaw locking interface is configured to engage with at least one jaw of two or more jaws of the hemoclip.

2. The closing ring of claim 1, further comprising:
  one or more tissue guards at a distal end, the one or more tissue guards having a central opening to allow an actuation wire to pass through; and/or
  a common interface on the body, the common interface configured to engage with the catheter or any of the two or more jaws of the hemoclip.

3. The closing ring of claim 2, wherein one or more of the at least one catheter interface, the at least one jaw locking interface, and the common interface are openings on the body; and/or wherein the one or more of the at least one catheter interface, the at least one jaw interface, and the common interface are openings having a geometric shape.

4. The closing ring of claim 1, wherein the body is hollow and configured to fit over a hub supporting the two or more jaws of the hemoclip and within the catheter; and/or wherein the closing ring is configured to be advanced over the two or more jaws to hold the two or more jaws closed.

5. A hemoclip system, the system comprising:
  a hemoclip comprising a first and second jaw;
  a hub configured to connect to the hemoclip;
  a closing ring configured to fit over the hub;
  a catheter comprising a tunnel configured to fit the hemoclip; and
  a handle connected to the catheter,
  wherein the handle comprises a trigger connected to a gear system, the gear system is connected to a shell, and the shell is connected to the catheter.

6. The system of claim 5, further comprising an actuation wire routed through a channel in the hub.

7. The system of claim 6, wherein the hub comprises flexible tabs that are configured to releasably attached to a catch attached to the wire.

8. The system of claim 5, wherein:
  each of the first and second jaw comprise a locking tab; and/or
  the first and second jaw are attached to a joint; and/or
  the closing ring is configured to be advanced over the first and second jaws to hold the first and second jaws closed.

9. The system of claim 8, wherein the closing ring comprises at least one jaw locking interface configured to engage with the locking tab; and/or wherein the hub is configured to connect to the hemoclip at the joint.

10. The system of claim 5, further comprising:
  an endoscope comprising the catheter.

11. The system of claim 5, wherein the catheter comprises one or more retention tabs configured to engage with one or more catheter interfaces of the closing ring.

12. The system of claim 5, wherein the handle further comprises:
  a thumbwheel;
  a main body; and
  an actuation wire control connected to a latch.

13. The system of claim 5, wherein the trigger is configured to advance the shell to advance the catheter when partially depressed.

14. The system of claim 5, wherein the catheter comprises a staggered laser cut pattern; and/or wherein the catheter comprises an outer sheath, a torque tube and an actuation wire.

15. A method of deploying a hemoclip, the method comprising:
- inserting a hemoclip attached to a hub with a closing ring attached to the hub inside a catheter;
- advancing a wire connected to the hub to advance the hemoclip to an end of the catheter;
- rotating the catheter to engage the catheter with the closing ring;
- advancing the closing ring engaged with the catheter to lock a pair of jaws of the hemoclip;
- rotating the catheter to disengage the catheter from the closing ring; and
- retracting the wire to disconnect the hub from the wire.

16. The method of claim 15, wherein:
- engaging the catheter with the closing ring comprises rotating the catheter so that a retention tab protrudes through an interface window of the closing ring; and/or
- advancing the wire to the hub to advance the hemoclip to the end of the catheter comprises advancing the wire until an advancement stop on the closing ring contacts the retention tab on the catheter; and/or
- retracting the wire to disconnect the hub from the wire comprises pulling a catch connected to the wire out of one or more flexible tabs of the hub.

17. The method of claim 15, wherein the closing ring comprises a locking window; and wherein advancing the closing ring to lock a pair of jaws of the hemoclip comprises engaging a locking tab on at least one of the pair of jaws with the locking window.

18. The method of claim 15, further comprising, prior to locking the pair of jaws disengaging the catheter from the closing ring and retracting the hemoclip along with the closing ring.

* * * * *